US009548965B2

(12) United States Patent
Wang et al.

(10) Patent No.: US 9,548,965 B2
(45) Date of Patent: Jan. 17, 2017

(54) PROXY METHODS FOR SUPPRESSING BROADCAST TRAFFIC IN A NETWORK

(71) Applicant: Nicira, Inc., Palo Alto, CA (US)

(72) Inventors: Hua Wang, Beijing (CN); Jianjun Shen, Beijing (CN); Donghai Han, Beijing (CN); Caixia Jiang, Beijing (CN); Wei Lu, Beijing (CN); Rahul Korivi Subramaniyam, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 14/070,360

(22) Filed: Nov. 1, 2013

(65) Prior Publication Data

US 2015/0058968 A1   Feb. 26, 2015

Related U.S. Application Data

(60) Provisional application No. 61/870,207, filed on Aug. 26, 2013.

(51) Int. Cl.
*H04L 29/06* (2006.01)
*H04L 12/58* (2006.01)
(Continued)

(52) U.S. Cl.
CPC ....... *H04L 63/0281* (2013.01); *H04L 63/0236* (2013.01); *H04L 63/1441* (2013.01);
(Continued)

(58) Field of Classification Search
CPC .... H04L 63/0281; H04L 51/12; H04L 61/103; H04L 61/2015; H04L 61/6013; H04L 61/6022; G06F 9/45558; G06F 2009/45595
See application file for complete search history.

(56) References Cited

U.S. PATENT DOCUMENTS 6,016,316 A * 1/2000 Moura ............... H04B 7/18523
348/E5.008
6,456,624 B1   9/2002 Eccles et al.
(Continued)

FOREIGN PATENT DOCUMENTS

EP          2566129        3/2013
WO     WO 2008/095010     8/2008
(Continued)

OTHER PUBLICATIONS

International Search Report and Written Opinion for PCT/US2014/036271, Sep. 9, 2014 (mailing date), Nicira, Inc.
(Continued)

*Primary Examiner* — Theodore C. Parsons
*Assistant Examiner* — James J Wilcox
(74) *Attorney, Agent, or Firm* — Adeli LLP

(57) ABSTRACT

Some embodiments use proxies on host devices to suppress broadcast traffic in a network. Each host in some embodiments executes one or more virtual machines (VMs). In some embodiments, a proxy operates on each host between each VM and the underlying network. For instance, in some of these embodiments, a VM's proxy operates between the VM and a physical forwarding element executing on the VM's host. The proxy monitors the VM's traffic, and intercepts broadcast packets when it knows how to deal with them. The proxy connects to a set of one or more controllers that provides a directory service that collects and maintains global information of the network. By connecting to the controller cluster, the proxy can obtain information that it can use to resolve broadcast requests. In some embodiments, the connection between the proxy and the controller cluster is encrypted and authenticated, to enhance the security. Also, in some embodiments, the connection is an indirect connection through an agent that executes on the host device and connects the proxies of the host device with the controller cluster.

26 Claims, 14 Drawing Sheets

(51) Int. Cl.
*H04L 29/12* (2006.01)
*G06F 9/455* (2006.01)

(52) U.S. Cl.
CPC ...... *H04L 63/1466* (2013.01); *G06F 9/45558* (2013.01); *G06F 2009/45595* (2013.01); *H04L 51/12* (2013.01); *H04L 61/103* (2013.01); *H04L 61/2015* (2013.01); *H04L 61/6013* (2013.01); *H04L 61/6022* (2013.01)

(56) References Cited

U.S. PATENT DOCUMENTS

| | | | |
|---|---|---|---|
| 6,493,767 B1 | 12/2002 | Ishida et al. | |
| 6,862,264 B1* | 3/2005 | Moura | H04B 7/18523 348/E5.008 |
| 7,009,974 B1* | 3/2006 | Fotedar | H04L 61/103 370/392 |
| 7,260,648 B2 | 8/2007 | Tingley et al. | |
| 7,478,173 B1 | 1/2009 | Delco | |
| 7,760,735 B1* | 7/2010 | Chen et al. | 370/392 |
| 7,802,000 B1 | 9/2010 | Huang et al. | |
| 7,818,452 B2 | 10/2010 | Matthews et al. | |
| 7,948,986 B1 | 5/2011 | Ghosh et al. | |
| 8,190,767 B1 | 5/2012 | Maufer et al. | |
| 8,614,820 B2 | 12/2013 | Kamei | |
| 9,264,313 B1 | 2/2016 | Manuguri et al. | |
| 9,319,336 B2* | 4/2016 | Thakkar | H04L 47/50 |
| 2002/0013858 A1 | 1/2002 | Anderson | |
| 2003/0026258 A1 | 2/2003 | Takatani et al. | |
| 2003/0093481 A1 | 5/2003 | Mitchell et al. | |
| 2004/0054799 A1 | 3/2004 | Meier et al. | |
| 2007/0061492 A1 | 3/2007 | van Riel | |
| 2007/0101323 A1 | 5/2007 | Foley et al. | |
| 2007/0286209 A1 | 12/2007 | Wang et al. | |
| 2008/0072305 A1 | 3/2008 | Casado et al. | |
| 2008/0151893 A1 | 6/2008 | Nordmark et al. | |
| 2008/0189769 A1 | 8/2008 | Casado et al. | |
| 2009/0129271 A1 | 5/2009 | Ramankutty et al. | |
| 2009/0235325 A1 | 9/2009 | Dimitrakos et al. | |
| 2009/0249472 A1 | 10/2009 | Litvin et al. | |
| 2010/0115080 A1 | 5/2010 | Kageyama | |
| 2011/0107331 A1 | 5/2011 | Evans et al. | |
| 2011/0142053 A1 | 6/2011 | Van Der Merwe et al. | |
| 2011/0202920 A1 | 8/2011 | Takase | |
| 2011/0246633 A1* | 10/2011 | Khosravi | H04L 67/2819 709/223 |
| 2011/0264610 A1 | 10/2011 | Armstrong et al. | |
| 2011/0299402 A1 | 12/2011 | Vobbilisetty et al. | |
| 2011/0299537 A1 | 12/2011 | Saraiya et al. | |
| 2011/0317703 A1 | 12/2011 | Dunbar et al. | |
| 2011/0320821 A1 | 12/2011 | Alkhatib et al. | |
| 2012/0014387 A1 | 1/2012 | Dunbar et al. | |
| 2012/0158997 A1 | 6/2012 | Hsu et al. | |
| 2012/0307826 A1* | 12/2012 | Matsuoka | 370/390 |
| 2012/0323987 A1 | 12/2012 | Cantu et al. | |
| 2013/0054761 A1 | 2/2013 | Kempf et al. | |
| 2013/0060940 A1* | 3/2013 | Koponen | H04L 12/4633 709/225 |
| 2013/0073743 A1 | 3/2013 | Ramasamy et al. | |
| 2013/0148656 A1 | 6/2013 | Zhang et al. | |
| 2013/0227550 A1 | 8/2013 | Weinstein et al. | |
| 2013/0266015 A1 | 10/2013 | Qu et al. | |
| 2013/0268930 A1* | 10/2013 | Saidi et al. | 718/1 |
| 2013/0332983 A1 | 12/2013 | Koorevaar et al. | |
| 2014/0019639 A1 | 1/2014 | Ueno | |
| 2014/0059544 A1 | 2/2014 | Koganty et al. | |
| 2014/0068602 A1 | 3/2014 | Gember et al. | |
| 2014/0115578 A1 | 4/2014 | Cooper et al. | |
| 2014/0195666 A1 | 7/2014 | Dumitriu et al. | |
| 2015/0003453 A1 | 1/2015 | Sengupta et al. | |
| 2015/0052522 A1* | 2/2015 | Chanda | G06F 9/455 718/1 |
| 2015/0058463 A1 | 2/2015 | Wang et al. | |
| 2015/0103645 A1* | 4/2015 | Shen | H04L 41/042 370/221 |
| 2015/0103661 A1* | 4/2015 | Shen | H04L 41/042 370/235 |
| 2015/0172222 A1* | 6/2015 | Liao | H04L 49/356 370/392 |
| 2015/0180673 A1* | 6/2015 | Kuwata | H04L 45/16 370/254 |
| 2015/0180824 A1* | 6/2015 | Atanasov | H04L 61/2015 709/224 |
| 2016/0057014 A1* | 2/2016 | Thakkar | G06F 9/45558 709/223 |
| 2016/0127306 A1* | 5/2016 | Wang | H04L 67/16 370/390 |

FOREIGN PATENT DOCUMENTS

| | | |
|---|---|---|
| WO | WO 2012/051884 | 4/2012 |
| WO | WO 2012/093429 | 7/2012 |
| WO | PCT/US2014/036271 | 4/2014 |
| WO | WO 2015/030882 | 3/2015 |

OTHER PUBLICATIONS

Narten, Thomas, et al., "Address Resolution Problems in Large Data Center Networks," Jan. 2013, pp. 1-17, Internet Engineering Task Force (IETF).

Shah, Himanshu, et al., "ARP Broadcast Reduction for Large Data Centers," Oct. 28, 2011, pp. 1-11, Internet Engineering Task Force (IETF).

Elmeleegy, Khaled, et al., "EtherProxy: Scaling Ethernet by Suppressing Broadcast Traffic," IEEE INFOCOM 2009, Apr. 19, 2009, pp. 1584-1592, IEEE.

Portions of prosecution history of U.S. Appl. No. 14/070,346, May 14, 2015, Wang, Hua, et al.

Author Unknown, "Enabling Service Chaining on Cisco Nexus 1000V Series," Month Unknown, 2012, 25 pages, CISCO.

Dumitriu, Dan Mihai, et al. (U.S. Appl. No. 61/514,990, filed Aug. 4, 2011).

Greenberg, Albert, et al., "VL2: A Scalable and Flexible Data Center Network," SIGCOMM'09, Aug. 17-21, 2009, pp. 51-62, ACM, Barcelona, Spain.

Guichard, J., et al., "Network Service Chaining Problem Statement," Network Working Group, Jun. 13, 2013, 14 pages, Cisco Systems, Inc.

Joseph, Dilip, et al., "A Policy-aware Switching Layer for Date Centers," Jun. 24, 2008, 26 pages, Electrical Engineering and Computer Sciences, University of California, Berkeley, CA, USA.

Kim, Changhoon, et al., "Floodless in Seattle: A Scalable Ethernet Architecture for Large Enterprises," SIGCOMM'08, Aug. 17-22, 2008, pp. 3-14, ACM, Seattle, Washington, USA.

Mann, Vijay, etal., "Crossroads: Seamless VM Mobility Across Data Centers Through Software Defined Networking," IEEE Network Operations and Management Symposium (NOMS), Apr. 16-20, 2012, pp. 88-96, IEEE, Piscataway, NJ, US.

Mysore, Radhka Niranjan, et al., "PortLand: A Scalable Fault-Tolerant Layer 2 Data Center Network Fabric," Proc. of SIGCOMM, Aug. 17-21, 2009, pp. 1-12.

Sekar, Vyas, et al., "Design and Implementation of a Consolidated Middlebox Architecture," in Proc of NSDI, Month Unknown, 2012, 14 pages.

Sherry, Justine, et al., "Making Middleboxes Someone Else's Problem: Network Processing as a Cloud Service," in Proc. of SSIGCOMM, Aug. 13, 2012, 12 pages, SIGCOMM, Helsinki, Findland.

* cited by examiner

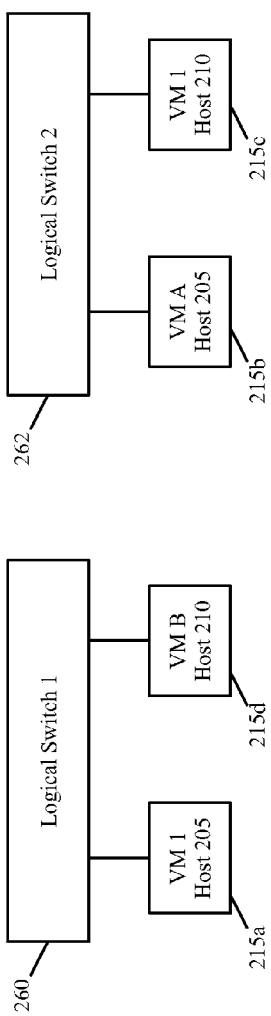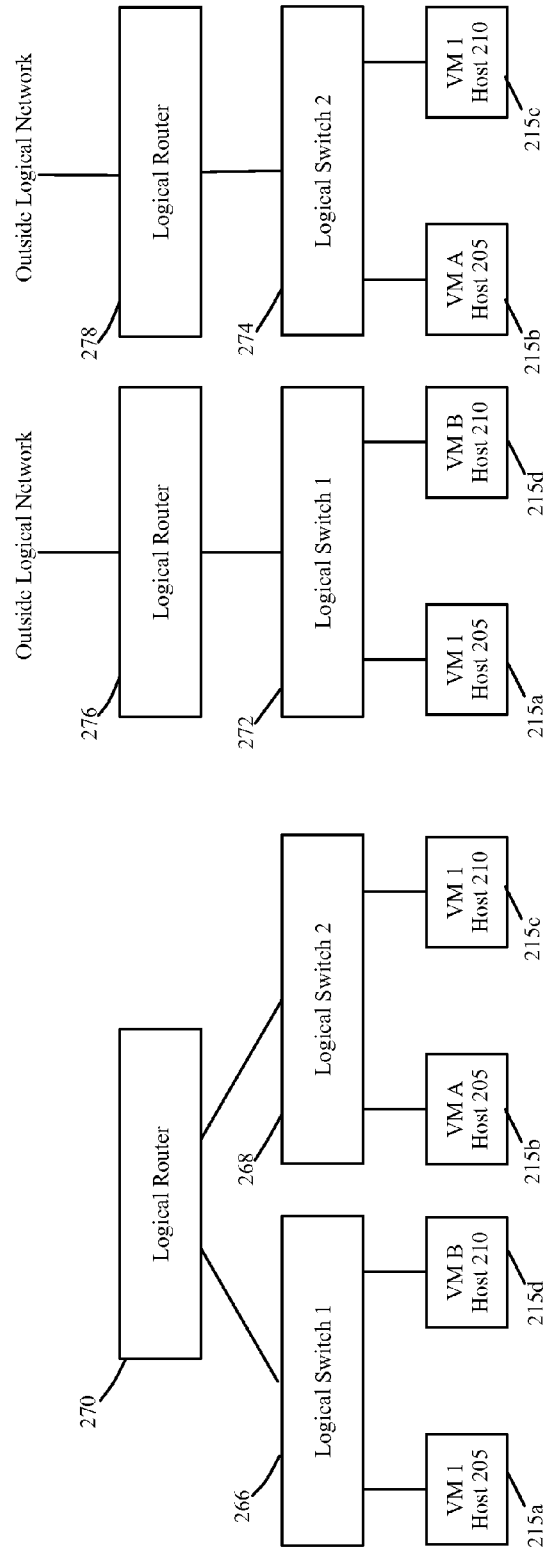

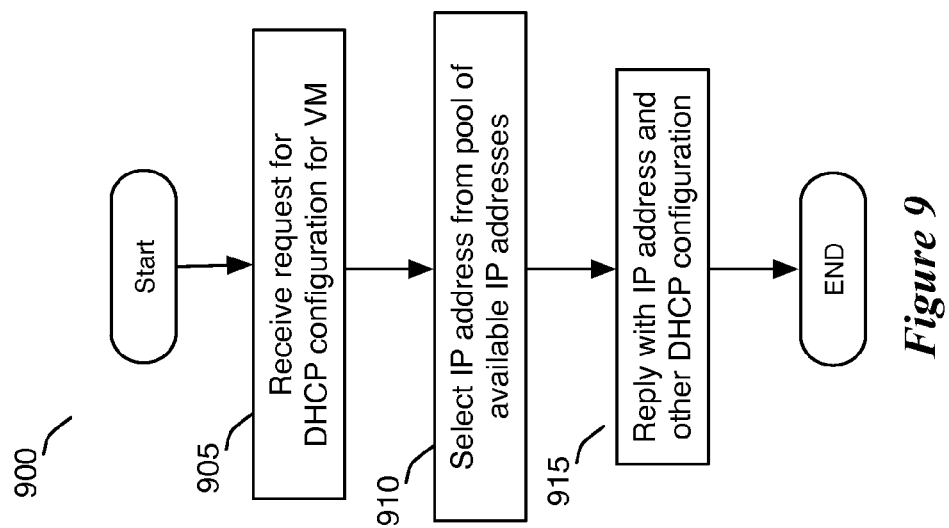
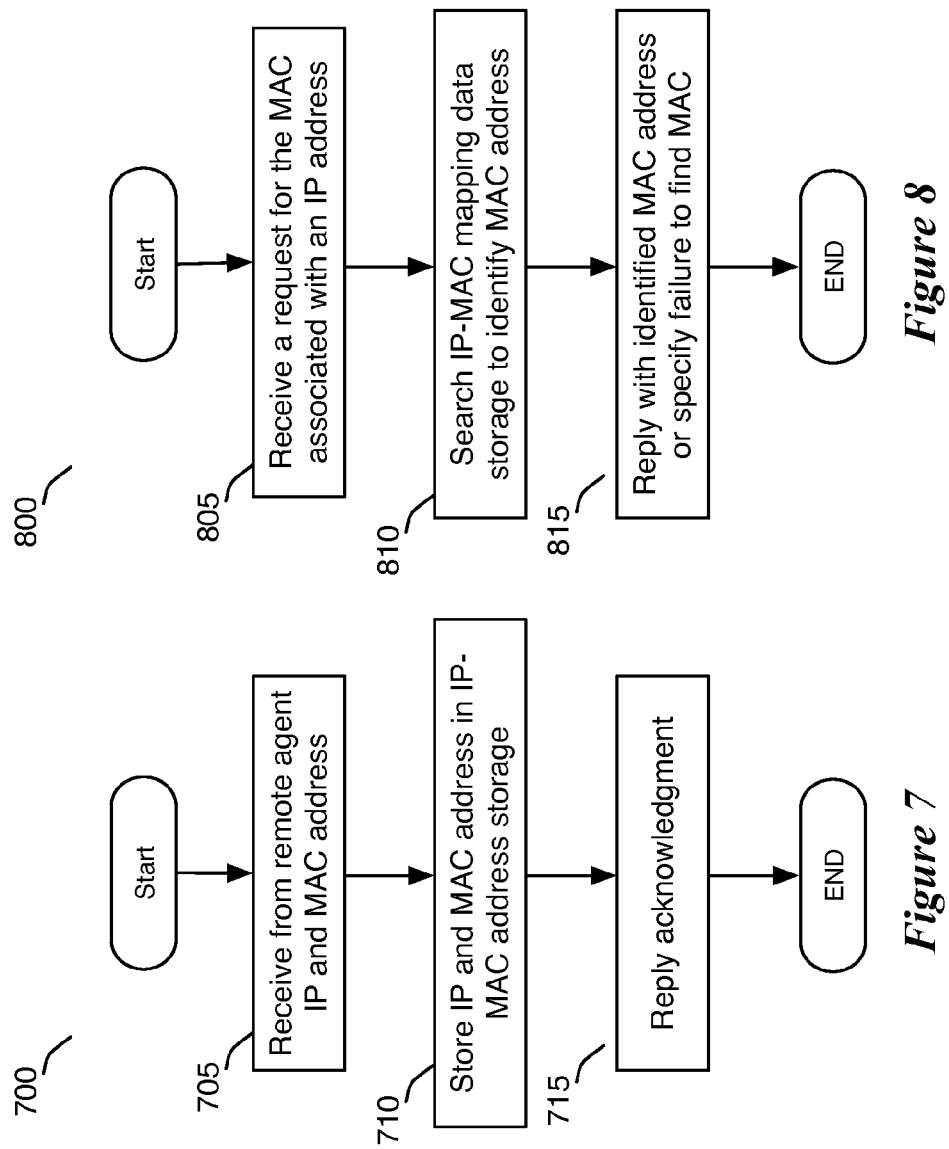
*Figure 9*
*Figure 8*
*Figure 7*

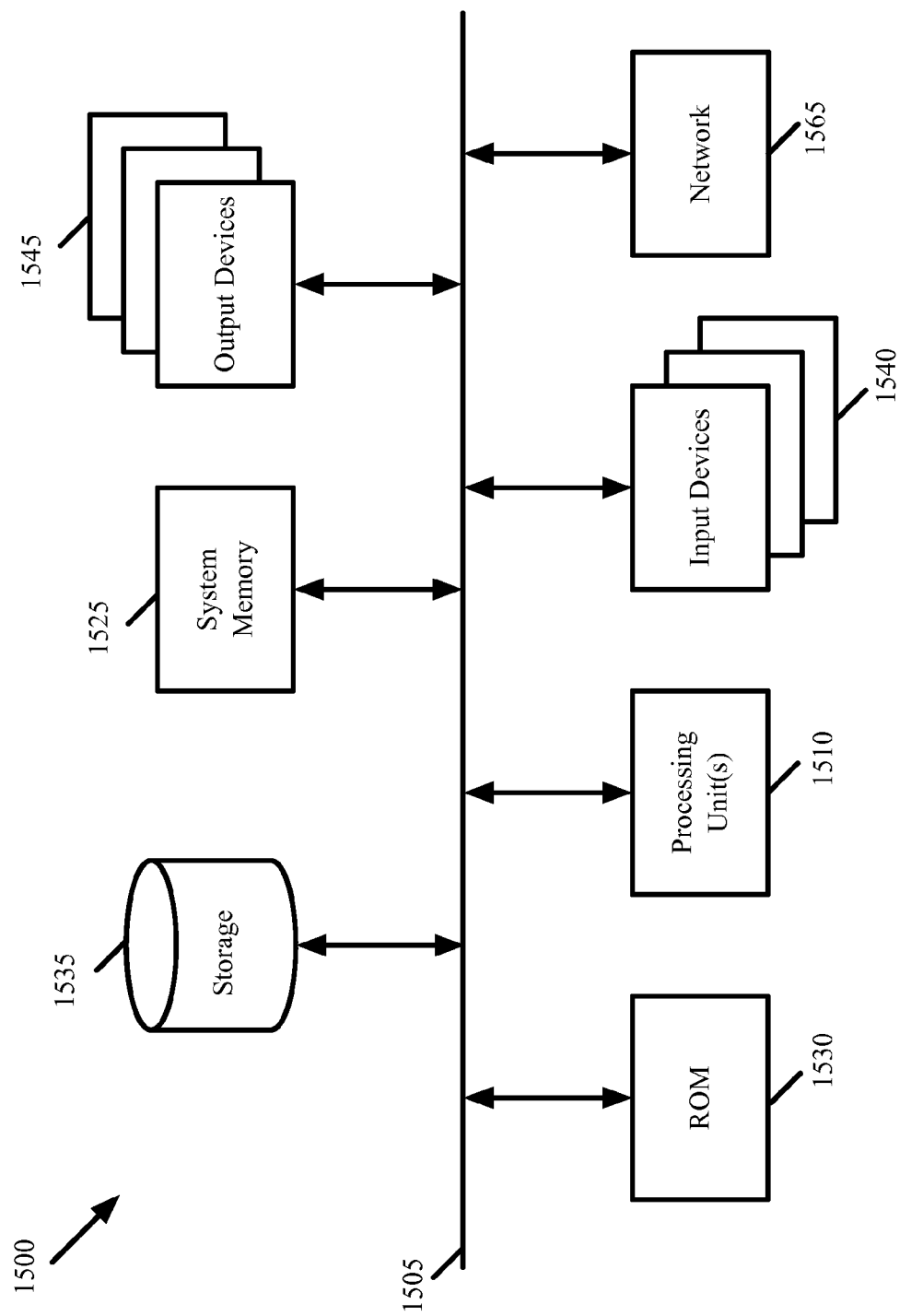

PROXY METHODS FOR SUPPRESSING BROADCAST TRAFFIC IN A NETWORK

CLAIM OF BENEFIT TO PRIOR APPLICATIONS

This application claims benefit to U.S. Provisional Patent Application 61/870,207, filed Aug. 26, 2013, which is incorporated herein by reference.

BACKGROUND

Some protocols utilize broadcast to perform their functionalities. Examples of such protocols include the address resolution protocol (ARP) and dynamic host configuration protocol (DHCP). Broadcast traffic is sent to all hosts within a broadcast domain. Accordingly, a broadcast packet usually consumes much more resources than a unicast packet. Previous researches have pointed out that broadcast traffic causes issues like scalability and security. For example, in a network with about 2500 hosts, studies have shown that a host receives 1150 ARP request per second (581 kbps) at peak. The amount of broadcast traffic roughly increases linearly with the number of hosts. Thus, when the host number becomes large, the ARP traffic becomes prohibitively high.

Broadcast traffic can also be easily eavesdropped by any entity in the network. A protocol relying on broadcast traffic is vulnerable to attacks if its design does not consider security carefully. For example, ARP is a trusting protocol and was not designed to cope with malicious hosts. The lack of authentication mechanism makes it vulnerable to ARP poisoning/spoofing. An attacker can build fake ARP replies to compromise hosts' ARP cache, and then perform attacks such as man-in-the-middle, host impersonation, DoS, etc.

These issues also exist in virtual networks, such as virtual layer 2 networks based on VXLAN or NVGRE. These protocols use headers higher than layer 3 to encapsulate packets and can cross layer 3 boundaries, so a virtual network can be created across multiple subnets. A broadcast packet in such a virtual network needs to be sent to all nodes located in different subnets, using layer 3 multicast protocols (e.g., PIM) or unicasts to all hosts.

When the layer 3 multicast is used, the routers need to maintain the state of a multicast group for each virtual network. When the number of multicast groups is large (e.g. VXLAN supports $2^{16}$ virtual networks), the routers' workload could be very high. A mitigating approach is to share a multicast group among multiple virtual networks, but this approach leads to receipts of unrelated packets and therefore causes performance decrement. Besides, many customers are reluctant to enable multicast in their physical network.

If the unicast approach is used, a host needs to send one copy of a broadcast packet to each host that the virtual network spans, or each VM in a virtual network. For a large virtual layer 2 network, this will consume a lot of resources, including computation resources at the source entity and bandwidth resources at the physical network.

Besides, both multicast and unicast approaches consume not only network resources within a subnet, but also routers among subnets. Therefore, compared with attacks on a physical layer 2 network, a successful DoS attack that floods ARP packets to a virtual layer 2 network can have a large impact.

BRIEF SUMMARY

Some embodiments use proxies on host devices to suppress broadcast traffic in a network. Each host in some embodiments executes one or more virtual machines (VMs). In some embodiments, a proxy operates on each host between each VM and the underlying network. For instance, in some of these embodiments, a VM's proxy operates between the VM and a physical forwarding element executing on the VM's host. In some embodiments, the physical forwarding elements of the host devices are software forwarding elements that execute on the host devices to collectively implement different logical forwarding elements (e.g., logical switches, logical routers, etc.) for different logical networks of different tenants, users, departments, etc. that use the same shared computing and networking resources.

The proxy monitors the VM's traffic, and intercepts broadcast packets when it knows how to deal with them. The proxy connects to a set of one or more controllers that provides a directory service that collects and maintains global information of the network. By connecting to the controller cluster, the proxy can obtain information that it can use to resolve broadcast requests. In some embodiments, the connection between the proxy and the controller cluster is encrypted and authenticated, to enhance the security. Also, in some embodiments, the connection is an indirect connection through an agent that executes on the host device and connects the proxies of the host device with the controller cluster.

Two examples of broadcast traffic that the proxies of some embodiment suppress are ARP broadcast messages and DHCP broadcast messages. To suppress ARP or DHCP broadcast traffic, the directory service collects IP-MAC mappings of all VMs in the logical network and stores DHCP configuration data or DHCP server data. In some embodiments, some of the IP and MAC addresses (e.g., some of the addresses maintained by the directory service) are logical addresses. For instance, in some embodiments, these addresses include logical IP and MAC addresses associated with VMs, VNIC (virtual network interface cards) of the VMs and/or the ports of the physical forwarding elements executing on the hosts.

The proxy for a particular VM monitors ARP traffic. When it detects an ARP request, the proxy converts the request to a query to the global IP-MAC mappings. In some embodiments, the proxy then supplies the query directly or indirectly (e.g., through another agent) to the controller cluster to obtain the desired MAC (media access control) address, while in other embodiments it looks up the MAC address in a copy of the global IP-MAC mapping that the proxy or its host maintains each time that the controller cluster pushes an update to this mapping to the proxies. After finding the MAC, the proxy builds an ARP reply on behalf of the destination VM, and supplies the reply back to the particular VM as if the reply was sent from the destination VM.

Some embodiments suppress DHCP broadcast traffic as follows. The proxy for a particular VM monitors DHCP traffic. Whenever the proxy receives a DHCP discover message, it converts this message to a unicast message (e.g., a unicast packet or a remote procedure call (RPC)) that it sends directly or indirectly to the directory service that performs the DHCP server's functionality. Upon receiving an IP (internet protocol) address from the directory service in response to its unicast message, the proxy formulates a DHCP offer message and supplies this message as a packet to the particular VM as if the packet was sent from the DHCP server. Instead of querying the directory service for the IP address, the proxy of some embodiments uses a bundle of IP addresses that it or its host receives from the directory service, in order to select an IP address for the VM and to formulate a reply to the DHCP discover message that it receives from the VM. Alternatively, in some embodiments, the directory services pushes to a host, or allows a host to pull, the address of a DHCP server to use to process a DHCP broadcast for a particular VM.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 2B illustrates two logical switches that are created by the PFEs of two different host devices to connect the VMs of two different entities.

FIGS. 2C and 2D illustrate additional examples of logical switches and logical routers.

FIGS. 7 and 8 illustrate several processes performed by the directory service of some embodiments in order to address ARP broadcast messages.

FIG. 9 illustrates a process that the directory service performs in some embodiments to handle requests for DHCP configurations that are needed to resolve DHCP discover broadcasts.

FIG. 15 conceptually illustrates an electronic system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments use proxies on host devices to suppress broadcast traffic in a network. Each host in some embodiments executes one or more virtual machines (VMs). In some embodiments, a proxy operates on each host between each VM and the underlying network. For instance, in some of these embodiments, a VM's proxy operates between the VM and a physical forwarding element executing on the VM's host. In some embodiments, the physical forwarding elements of the host devices are software forwarding elements that execute on the host devices to collectively implement different logical forwarding elements (e.g., logical switches, logical routers, etc.) for different logical networks of different tenants, users, departments, etc. that use the same shared computing and networking resources.

The proxy monitors the VM's traffic, and intercepts broadcast packets when it knows how to deal with them. The proxy connects to a set of one or more controllers that provides a directory service that collects and maintains global information of the network. By connecting to the controller cluster, the proxy can obtain information that it can use to resolve broadcast requests. In some embodiments, the connection between the proxy and the controller cluster is encrypted and authenticated, to enhance the security. Also, in some embodiments, the connection is an indirect connection through an agent that executes on the host device and connects the proxies of the host device with the controller cluster. Through its connection with the controller cluster, the proxy can pull information directly or indirectly from the directory service in order to resolve broadcast messages that it intercepts. Alternatively, the directory service can push the information to the proxy or its host, which can then be used to resolve broadcast messages intercepted by the proxy.

Figure 1:
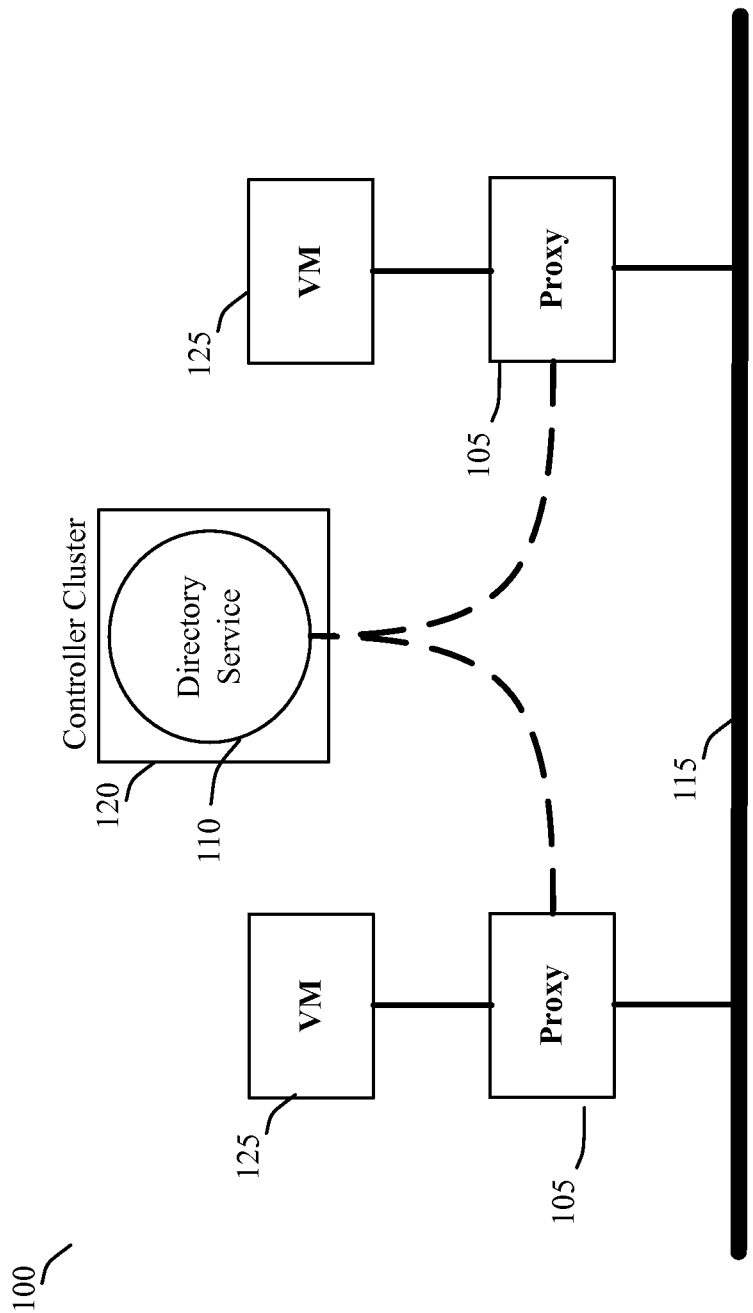
FIG. 1 illustrates a broadcast-suppressing, proxy architecture of some embodiments.

FIG. 1 illustrates a broadcast-suppressing, proxy architecture 100 of some embodiments. Specifically, it shows that this architecture includes two components to deal with broadcast packets: the proxy 105 and the directory service 110. As shown in FIG. 1, each proxy sits between a VM and the physical network, which in this example is a layer 2 network 115. The proxy intercepts broadcast packets sent by the VM, while allowing non-broadcast packets to pass through along the normal data path for packets. The term "packet" is used here as well as throughout this application to refer to a collection of bits in a particular format sent across a network. One of ordinary skill in the art will recognize that the term "packet" may be used herein to refer to various formatted collections of bits that may be sent across a network, such as Ethernet frames, TCP segments, UDP datagrams, IP packets, etc.

As shown in FIG. 1, the directory service 110 executes on a set of one or more controllers 120. Through a network, each proxy has a connection to the controller cluster 120 and its associated directory service 110 for exchanging control information. The control connection is in-band (in the same channel as the data) in some embodiments, while it is out-of-band (along a dedicated control channel) in other embodiments. Also, the connection between each proxy and the directory service is a direct connection in some embodiments, while it is an indirect connection (e.g., through another module) in other embodiments. In some embodiments, the connection between each proxy and the directory service, or between the host on which the proxy executes and the directory service is encrypted and authenticated to enhance the security. In some embodiments, the controller cluster 120 is responsible for providing the management and control plane functionalities to manage and control the logical network. In other embodiments, the controller cluster 120 only provides control plane functionality. Providing data to allow the proxies to handle broadcast messages is one example of control plane functionality. In some embodiments, the controller cluster provides other control plane functionalities, such as logical forwarding operations (e.g., logical router operations), multicast proxy operations (e.g., intercepting multicast packets and converting them to a number of unicast packets), and handling unknown traffic.

The directory service 110 collects and maintains global information of the network. By connecting to the controller cluster, the proxy can obtain information that it can use to resolve broadcast requests. In different embodiments, or for different types of broadcast packets, the proxies access the global information on the directory service in different ways. For instance, in some embodiments, the proxies send queries directly or indirectly to the directory service for desired information.

Alternatively, in other embodiments, the directory service 110 pushes some or part of the global information to the proxies or to the hosts on which the proxies execute. In these embodiments, the proxies or their hosts maintain the pushed global information (e.g., in a local database), so that this local copy of the information can be searched (e.g., queried) whenever the proxies need this data to resolve how to respond to an intercepted broadcast message. In some embodiments, each proxy maintains its own local copy of the pushed global information, while in other embodiments, several proxies on the same host share the same local copy of the pushed global information.

Also, in some embodiments, the proxies for some broadcast packets send queries to the directory service for the desired information, while for other broadcast packets search their local copies of the global information from the directory service. In other words, the proxies of some embodiments use the pull technique to resolve some broadcast traffic, while using the push technique to resolve other broadcast traffic. The pulling and pushing approaches have different advantages. The pulling approach (i.e., querying the directory service for the needed data) does not require the proxies to keep copies of the global information, and thus scales better. The pushing approach (i.e., receiving pushed data to search from the directory service) eliminates the query message to the service during lookup, and can perform better.

To suppress ARP or DHCP broadcast traffic, the directory service collects IP-MAC mappings of all VMs in the logical network and stores DHCP configuration data or DHCP server data. In some embodiments, some of the IP and MAC addresses (e.g., some of the addresses maintained by the directory service) are logical addresses. For instance, in some embodiments, these addresses include logical IP and MAC addresses associated with VMs, VNIC (virtual network interface cards) of the VMs and/or the ports of the physical software switches executing on the hosts.

I. Pull Based Proxy Architecture

Several embodiments that include proxies that query the directory services to obtain MAC and IP addresses in order to handle ARP and DHCP broadcast messages will now be described. In these embodiments, the proxies directly or through intermediate agents query the directory service for MAC addresses to resolve ARP broadcasts, and query the directory service for DHCP configuration (including IP addresses) to resolve DHCP discover broadcasts. However, as mentioned above, other embodiments have the directory service push IP-MAC mapping and DHCP configuration to the proxies or their hosts on which the proxies execute, and have the proxies or the intermediate agents query the pushed mapping data. Several such push embodiments will be further described below in section II.

To suppress ARP messages, the directory service of some embodiments maintains the IP-MAC mappings of all VMs. Such mapping is needed to resolve ARP messages. A device or a virtual machine sends an ARP message whenever it needs to identify the MAC address for another device for which it has the other device's IP address. Even with the IP address, a MAC address is needed to resolve the destination of a packet that is sent to a device along a shared access media, such as Ethernet.

To maintain IP-MAC mappings of all VMs, the directory service collects mapping information from the ARP proxies, which in some embodiments are the same proxies that handle the DHCP broadcast packets, while in other embodiments are different proxies than those that handle the DHCP broadcast packets. In some embodiments, the ARP proxy of each VM has the capability of detecting its VM's IP changes. In some embodiments, an ARP proxy detects such IP changes by monitoring ARP and DHCP traffic, communicating with the virtualization tools, or looking up explicit configuration. For instance, in some embodiments, the ARP proxy (1) identifies the IP address that it or a separate DHCP proxy for its VM obtains directly or indirectly from the directory service (e.g., an IP address in a DHCP acknowledge message), and (2) sends this IP address along with its VM's MAC address to the directory service for recording in the IP-MAC mapping storage.

Some embodiments learn the IP address in SPA (sender's protocol address) field of ARP request packets and gratuitous ARP packets. Also, in some embodiments, virtualization tools run in a VM, and these tools have a channel to talk to the kernel. Such tools can be programmed to monitor for a VM's IP and inform the ARP proxy. Moreover, in some environments, the IPs are statically allocated. Some embodiments get each VM's IP from the configuration database directly. For example, the virtualization layer's IP address management (IPAM) can assign static IPs to VMs. In some embodiments, IPAM runs on a central node, and the controller can learn the configuration from IPAM directly. Irrespective of how changes to the IP addresses occur, the ARP proxies or other modules of some embodiments send the latest IP and MAC addresses to the directory service, which in turn stores them in its database.

The directory service uses the IP-MAC mapping information that it maintains to handle ARP requests that it receives from the ARP proxies. In particular, each ARP proxy monitors its VM's corresponding traffic. The ARP proxy passes all non-broadcast messages along the regular data path for the VM messages, as further described below. However, when an ARP proxy detects an ARP broadcast packet, the ARP proxy of some embodiments converts this packet to a query and sends the query (either directly or through an intermediate agent executing on the same host)

to the directory service. The directory service then searches the IP-MAC mapping information that it stores in a data storage (e.g., in a database), and if it finds that the mapping for the IP exists, the directory service sends the MAC address back to the proxy. After receiving the reply, the proxy builds an ARP reply, and sends the reply to the VM. In the entire process, no broadcast packet is sent through the underlying network.

The query from ARP proxy to the directory service could fail, because of broken connection, no mapping in directory service, or other reasons. To handle such failure cases, some embodiments employ one of two methods. The first one is to simply discard the ARP request, so eventually the VM will encounter a "not reachable" error. This method turns the directory service into the single point of failure, but it gives the administrator more restrictive control over the network. For example, the ARP proxy can be configured to only learn IP-MAC mappings that are explicitly configured by the administrator, so that other IPs cannot be reached in the network.

Another method is to fall back to broadcast mode. On lookup error, the ARP proxy re-injects the ARP request to the underlying network, and then it is broadcast to other VMs. In contrast to the first method, this method decreases the risk of the whole network failure, but any IP can work without an administrator's configuration.

Figure 2A:
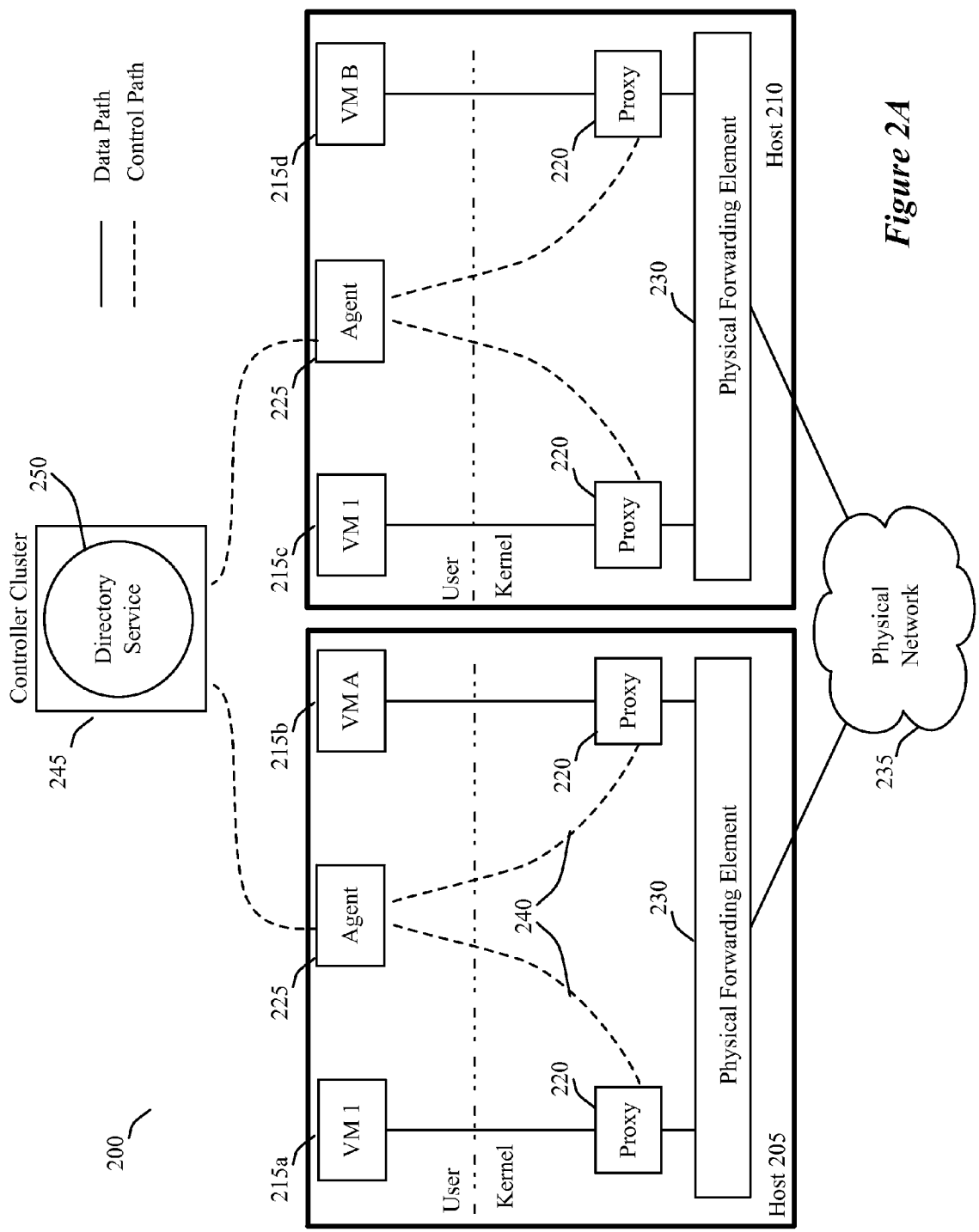
FIG. 2A illustrates a more specific broadcast-suppressing architecture of some embodiments of the invention.

FIG. 2A illustrates a more specific broadcast-suppressing architecture of some embodiments of the invention. This architecture is similar to the architecture 100 of FIG. 1 except that in the architecture 200 the proxies are shown to be between the VMs and the physical software forwarding elements (e.g., software switches). Also in this figure, the proxies communicate with the directory service through agents executing on the hosts and through the dedicated out-of-band control channels between the agents and the controller cluster.

As shown in FIG. 2A, the architecture 200 includes two host devices 205 and 210, several VMs 215 executing on each host device, one proxy 220 for each VM, one agent 225 for each host device, and a physical forwarding element 230 for each host device. In some embodiments, each host device is a computer on which one or more hypervisors (not shown) execute. The hosts connect to a physical network 235 through one or more wired or wireless network interfaces (not shown). The physical network includes numerous forwarding elements, such as routers, switches, etc., and the connections (e.g., wiring) between these elements. The physical network is a local area network (LAN) in some embodiments, a wide area network (WAN) in other embodiments, and a network of networks (e.g., the Internet) in still other embodiments.

FIG. 2A shows host 205 executing A virtual machines (VMs) 215 and host 210 executing B virtual machines 215. Each VM 215 on each host executes above a hypervisor that is running on the host. All the virtual machines of the hosts can belong to one logical network in some embodiments. In other embodiments, different virtual machines of a host can belong to different logical networks.

FIG. 2A further shows a physical forwarding element (PFE) 230 executing on each host. Each PFE is a software defined forwarding element. Many examples of such software defined forwarding elements exist today. These examples include vSphere software switches of VMware Inc., OVS forwarding elements of Nicira Inc., etc. These switches execute on host machines and provide managed forwarding element functionality at the edge of the network.

When a host executes different virtual machines for different logical networks, a software-defined PFE of the host in some embodiments allows one or more of its host's VMs that belong to one logical network to be part of the logical network with other VMs on other hosts without having their packets accessible to VMs on the same or different hosts that are not part of the same logical network. In other words, the PFEs on different hosts can be used to define a logical forwarding element (LFE) that defines a virtual/logical network for several VMs on several machines. In some embodiments, the same groups of PFEs can be used to define different LFEs for different sets of VMs because each PFE can isolate the packets forwarded through one logical network (i.e., one LFE) from the packets forwarded through another logical network (i.e., another LFE). To define the different LFEs, the controller cluster 245 configures and manages the PFEs, while in other embodiments, the controller cluster 245 leaves the configuring of the PFEs to other controllers. In other words, like the controller cluster 120, the cluster 245 provides both management and control plane functionalities in some embodiments, while in other embodiments it only provides control plane functionality.

Examples of logical forwarding elements are illustrated in FIGS. 2B-2D. Specifically, FIG. 2B illustrates two logical switches 260 and 262 that are created by the PFEs 230 of the hosts 205 and 210 to connect the VMs of two different entities. In this example, the logical L2 switch 260 connects two VMs 215a and 215d of one entity (e.g., one tenant) that execute on hosts 205 and 210, while logical L2 switch 262 connects two VMs 215b and 215c of another entity (e.g., another tenant) that execute on the same two hosts 205 and 210. The operation of each logical switch is distributed across the PFEs 230 on these two hosts.

In some embodiments, a logical switch provides an L2 connectivity to VMs connected to the logical switch. The logical L2 connectivity may be VXLAN backed (or may be implemented with any other overlay technologies like NVGRE, STT, etc.). When the logical L2 switch is implemented with VXLAN, VXLAN Network Identifier (VNI) may be used as the identifier of the LS.

The PFEs can also define logical routers. To do this, each host in some embodiments has a PFE to implement logical L2 switches, and a PFE to implement logical L3 routers, with the PFEs of other hosts. In other embodiments, each host has one PFE to implement both logical L2 switches and logical L3 routers with the PFEs of other hosts. FIG. 2C illustrates an example where the PFEs of the hosts 205 and 210 specify two logical switches 266 and 268 that are connected to each other with a logical router 270. In this arrangement, each logical switch may be connecting different groups of VMs of a tenant and each logical switch connects to the other logical switch through the logical router so that all of the VMs of the tenant can be connected through the logical network formed by the logical switches and the logical routers.

FIG. 2D illustrates another example of the distributed network topology that can be created with the logical switches and routers that are implemented by the L2 software switches and L3 software routers of the hosts 205 and 210. In this network topology, each logical switch (LS) 272 or 274 still provides L2 connectivity between several VMs. Each logical router 276 or 278 serves as an L3 interface between its logical network's LS 272 or 274 and computing devices outside of its logical network. The same functionality can also be provided in some embodiments by the logical router 270 of FIG. 2C.

To manage the physical forwarding elements, the controllers in some embodiments execute network control applications that direct the management of these elements. In some embodiments, the majority of the LFE operations are performed by the PFEs according to the configuration of these PFEs that is specified by the controller cluster 245. However, some of the LFE operations require real-time input from the controller clusters. Examples of such operations that require real-time input in some embodiments include ARP broadcasts, DHCP broadcasts, etc.

For such real-time input, each host has (1) a proxy 220 in the datapath between the VM and the PFE, and (2) an agent 225. As shown in FIG. 2A, each proxy is in the datapath between its corresponding VM and the PFE of its associated host. Each proxy is a module that executes on its host in order to examine packets sent along the data path from its associated VM to its associated PFE. When the proxy receives a non-broadcast packet or a broadcast packet that it does not know how to handle, it passes this packet along the data path to its associated PFE, which then performs its forwarding operations on this packet to drop the packet, or to forward the packet to other physical forwarding elements or to the packet's destination.

On the other hand, when the proxy receives a broadcast packet that it knows how to handle, it initiates a process to respond to or otherwise process this packet without sending out the broadcast packet to other hosts or VMs through the virtual or physical networks. In some embodiments, the process initiated by the proxy is along a control path 240 (i.e., a control channel) that is established between the proxy and its agent 225 and between the agent 225 and a directory service 250 that is provided by one or more controllers in a controller cluster 245.

In some embodiments, each proxy 220 can handle both ARP broadcast packets and DHCP discover packets. In other embodiments, each proxy 220 can only address one of these types of broadcast packets, e.g., can only handle ARP broadcasts or DHCP discover broadcasts. As further explained below in Section IV, some embodiments employ multiple proxies in the data path between each VM and its PFE to handle multiple different types of broadcast packets. For instance, in the data path between each VM and its PFE, some embodiments employ an ARP proxy and a DHCP proxy to handle respectively ARP broadcasts and DHCP discover broadcasts from the VM.

When the proxy receives an ARP broadcast or a DHCP broadcast packet, the proxy starts its process for communicating with its associated agent 225 to formulate a reply to the ARP or DHCP discover broadcast. In the architecture 200 shown in FIG. 2A, one agent is used for each host to coordinate all of the out-of-band communications between the proxies executing on the host and the controller cluster 245. In some embodiments, each agent 225 is responsible for handling all of the out-of-band communications between the controller cluster 245 and other modules (i.e., modules other than the proxy modules 220) executing on its host. In other embodiments, each agent 225 is only responsible for relaying the communications between the controller cluster 245 and the proxies 220.

As further described below, each agent relays messages from its proxies to the directory service 250 executing on the controller cluster to obtain the information necessary for resolving ARP and DHCP broadcasts. In some embodiments, the agents communicate with the directory service through a dedicated, secure control channel established between each agent and the directory service. This channel is encrypted and authenticated in some embodiments. In other embodiments, however, the agents communicate with the directory service through remote procedure calls (RPC).

As shown in FIG. 2A, the agents and VMs execute in the user space, while the proxies and PFEs execute in the kernel space in some embodiments. In some embodiments, the agents are similar to daemons that run in the user space, while the VMs execute on top of a VM monitor that is at the same level as the kernel. The agents in some of these embodiments execute as a user world process, similar to SSHD in Unix or Linux architectures. In some embodiments, a type of socket (e.g., a vmklink of VMware) is used to establish a communication channel between each proxy and its associated agent. Accordingly, in these embodiments, the communications between a proxy and its agent are along this socket.

Figure 3:
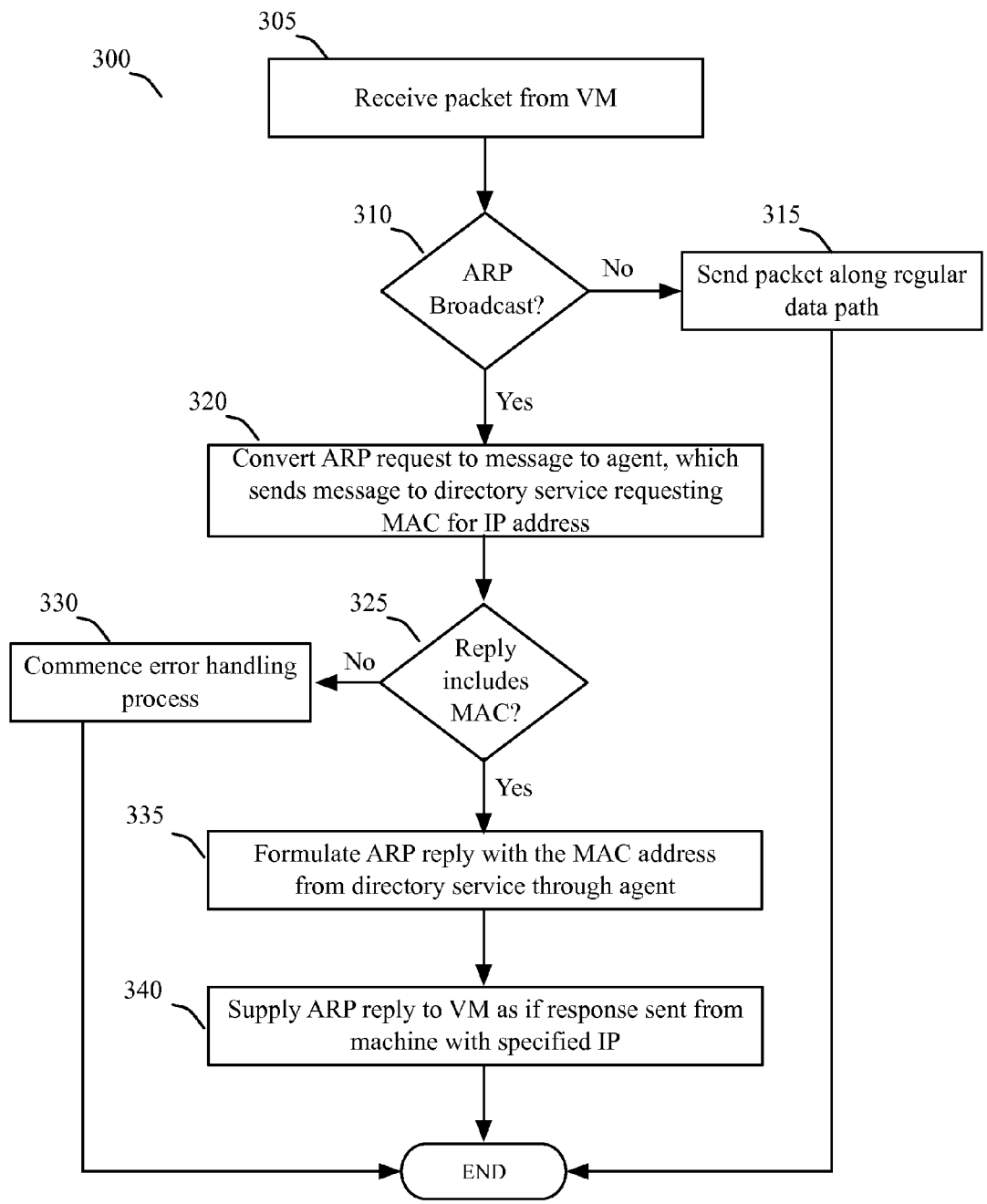
FIG. 3 conceptually illustrates a process performed by the proxy to handle an ARP broadcast.
Figure 4:
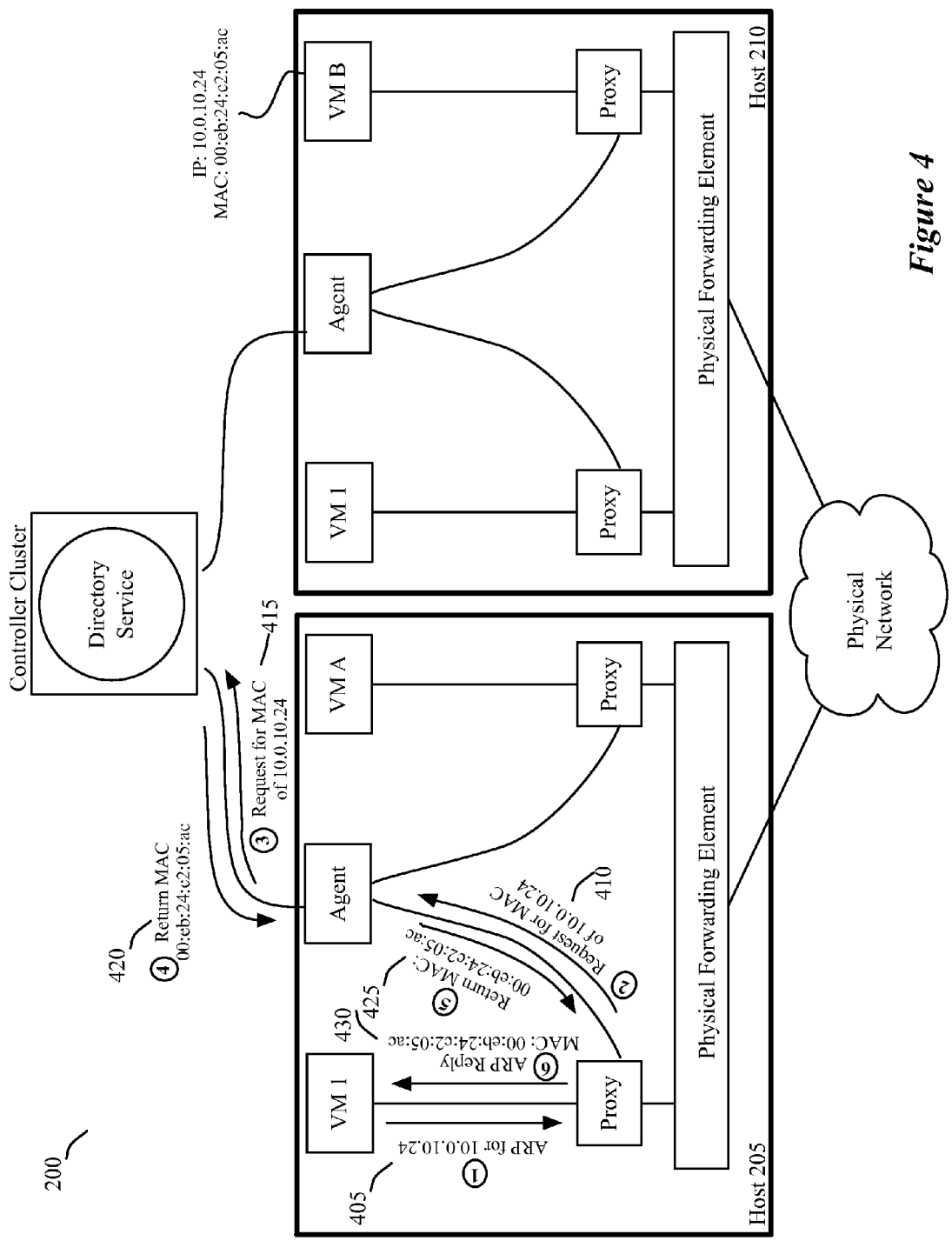
FIG. 4 illustrates the data flow through the architecture of FIG. 2A to handle the ARP broadcast.

The operation of the proxies 215, agents 225 and directory service 250 during an ARP broadcast will now be described by reference to FIGS. 3 and 4. FIG. 3 conceptually illustrates a process 300 performed by the proxy to handle an ARP broadcast, while FIG. 4 illustrates the data flow through the architecture 200 to handle the ARP broadcast.

As shown in FIG. 3, the process 300 starts (at 305) when the proxy 215 receives a packet from its VM. FIG. 4 shows an example of such a packet 405. In this example, the packet is an ARP from VM 1 of host 205 for the IP address 10.0.10.24. This ARP packet is a broadcast packet that is intended for transmission to all devices on the same logical network as VM 1 of the host 205. This ARP packet has the default FF:FF:FF:FF:FF:FF MAC address that is accepted by all devices, and is intended to direct any device with the matching IP address 10.0.10.24 to send an ARP reply with its particular MAC address. As shown in FIG. 4, VM B of host 210 has the IP address 10.0.10.24 and a MAC address 00:eb:24:c2:05:ac. VM 1 of host 205 and VM B of host 210 belong to the same logical network in some embodiments. Also, in some embodiments, the IP and MAC addresses are addresses defined in the address space that is set aside for the logical network to which VM 1 of host 205 and VM B of host 210 belong.

After receiving the packet (at 305), the process 300 determines (at 310) whether the packet is an ARP broadcast. If not, the process sends (at 315) the packet along the regular data path to the PFE 230 of the host or allows (at 315) another process that has called the proxy process 300 to send this packet along the regular data path to the PFE. After 315, the process ends.

On the other hand, when the received packet is an ARP broadcast, the process 300 generates (at 320) a message to its agent 225 to request the MAC address for the IP address contained in the ARP broadcast. The agent, in turn, relays this request to the directory service, in order to obtain the MAC address for the requesting proxy. In this manner, the process 300 converts the ARP broadcast that is intended for all devices on the logical network to a unicast message to the directory service through its agent.

FIG. 4 shows an example of this conversion. Specifically, it illustrates that in response to the ARP broadcast from VM 1 of host 205 for the IP address 10.0.10.24, the proxy sends a request 410 to its agent for the MAC address of the device with the IP address 10.0.10.24. In some embodiments, this request message has a different format than the ARP packet received from VM 1. For instance, instead of being an ARP request with the default MAC address FF:FF:FF:FF:FF:FF, the request message is a MAC address call or message to the agent. This call/message is sent along the dedicated control channel socket between the proxy and the agent and is a specific request to the agent for the specific MAC address stored by the directory service for the specific IP address 10.0.10.24.

In response to the request from the proxy, the agent sends a request 415 for this MAC address to the directory service 250, as shown in FIG. 4. This request is a message along a dedicated, secure control channel established between each agent and the directory service, while it is an RPC message in other embodiments. Again, instead of being a general broadcast message to all VMs on the logical network, the message from the agent to the directory service is a unicast message to the directory service. This message asks the directory service for the MAC address of the particular IP address 10.0.10.24.

As mentioned above, one or more controllers in a cluster of controllers provide the directory service. In some embodiments, different controllers can provide the directory service to a host agent for different LFEs. This is because some embodiments use a novel method for distributing control-channel communication load between multiple controllers in the network control system. The method of some embodiments distributes a controller assignment list to the host computers. A host agent then (1) uses this list to identify the appropriate controllers for the different LFEs implemented by the host's PFE or PFEs, and then (2) establishes out-of-band control channel connection with these controllers to obtain the data needed for processing the broadcast messages (e.g., the ARP or DHCP broadcast messages).

To identify the appropriate controller for each LFE, the controller assignment list of some embodiments includes two parameters for each LFE. One parameter is an index value (called an index parameter) that is derivable from an identifier that identifies the LFE (called an LFE identifier). The other parameter is an identifier (called a controller identifier) that identifies a controller that is responsible for processing requests for the LFE. In some embodiments, the controller identifier is an address (e.g., IP address) of the controller, while in other embodiments, the controller identifier is a value from which the address of the controller can be obtained (e.g., through another table).

Accordingly, to identify the appropriate controller for an LFE, a host agent in some embodiments computes an index value from the LFE's identifier, and then uses the generated index value to retrieve the controller identifier in the assignment list that has a matching index value. In some embodiments, the agent then establishes the control channel connection with the identified controller if it has not already established such a connection. This load-distribution scheme for distributing the control channel load across the controllers is further described in concurrently filed U.S. patent application Ser. No. 14/070,448, entitled "Controller Side Method of Generating and Updating a Controller Assignment List," now published as U.S. Patent Publication 2015/0103645. This concurrently filed application Ser. No. 14/070,448, now published as U.S. Patent Publication 2015/0103645, is incorporated herein by reference.

In the example illustrated in FIG. 4, the directory service uses the received IP address 10.0.10.24 to look up a MAC address in its IP-MAC mapping that it stores and maintains. Assuming that it finds the MAC address 00:eb:24:c2:05:ac of the specified IP address, the directory service returns the identified MAC address 00:eb:24:c2:05:ac in a return message 420 to the agent 225. In some embodiments, this reply is a parameter return that replies to an RPC from the agent, while in other embodiments, it is a message that replies to the message sent from the agent along the dedicated, secure control channel, which is established between the agent and the controller as described above. The agent then sends the proxy a reply 425 that contains the MAC address 00:eb:24:c2:05:ac. In some embodiments, this reply is through the socket connection between the proxy and agent.

FIG. 3 illustrates this reply as operation 330. However, before reaching operation 335, the process 300 has to first determine (at 325) whether the reply from the agent provides a MAC address. As mentioned above, the directory service might not store a MAC address for the IP address that is subject of a particular ARP message. Accordingly, in some situations, the directory service's reply to the agent will indicate that it could not find a MAC address for the specified IP address. In these situations, the agent's reply to the proxy will similarly indicate that no MAC address was identified for the specified IP address.

When the process determines (at 325) that the agent did not reply a MAC address, it transitions to 330 to initiate error handling process, and then ends. As mentioned above, some embodiments employ one of two methods to handle such failure cases. The first method is to simply discard the ARP request, so eventually the VM will encounter a "not reachable" error. The second method is to fall back to broadcast mode, where the ARP proxy re-injects the ARP request to the underlying network, so that the ARP broadcast can be broadcast to other VMs by the proxy's associated PFE.

When the process determines (at 325) that the agent's reply included a MAC address, the process then formulates (at 335) an ARP reply packet with the received MAC address, and then supplies (at 340) the ARP reply to the VM that sent the ARP broadcast. The ARP reply packet will be formatted as if the device that had the specified IP address (e.g., VM B of host 210 in FIG. 4) sent it in response to receiving the ARP request (e.g., from VM 1 of host 205 in FIG. 4). FIG. 4 illustrates the ARP reply 430 that the proxy sends to the VM 1 of host 205 to provide the MAC address 00:eb:24:c2:05:ac of VM B.

In some embodiments, each time an ARP request is resolved and a particular MAC address is obtained for a particular IP address, the ARP proxy or host agent stores in a storage of the host the IP-MAC mapping so that the next time an ARP request is received for the particular IP address, the ARP proxy or host agent can supply the cached particular MAC address to resolve the new ARP request. For such embodiments, the process 300 determines (before 320) whether its local cache of IP-MAC mapping contains a MAC address for the IP address of the ARP request. If so, it uses this cached MAC address to formulate and supplies the ARP reply to the requesting VM and then foregoes the remaining operations of the process 300.

Figure 5:
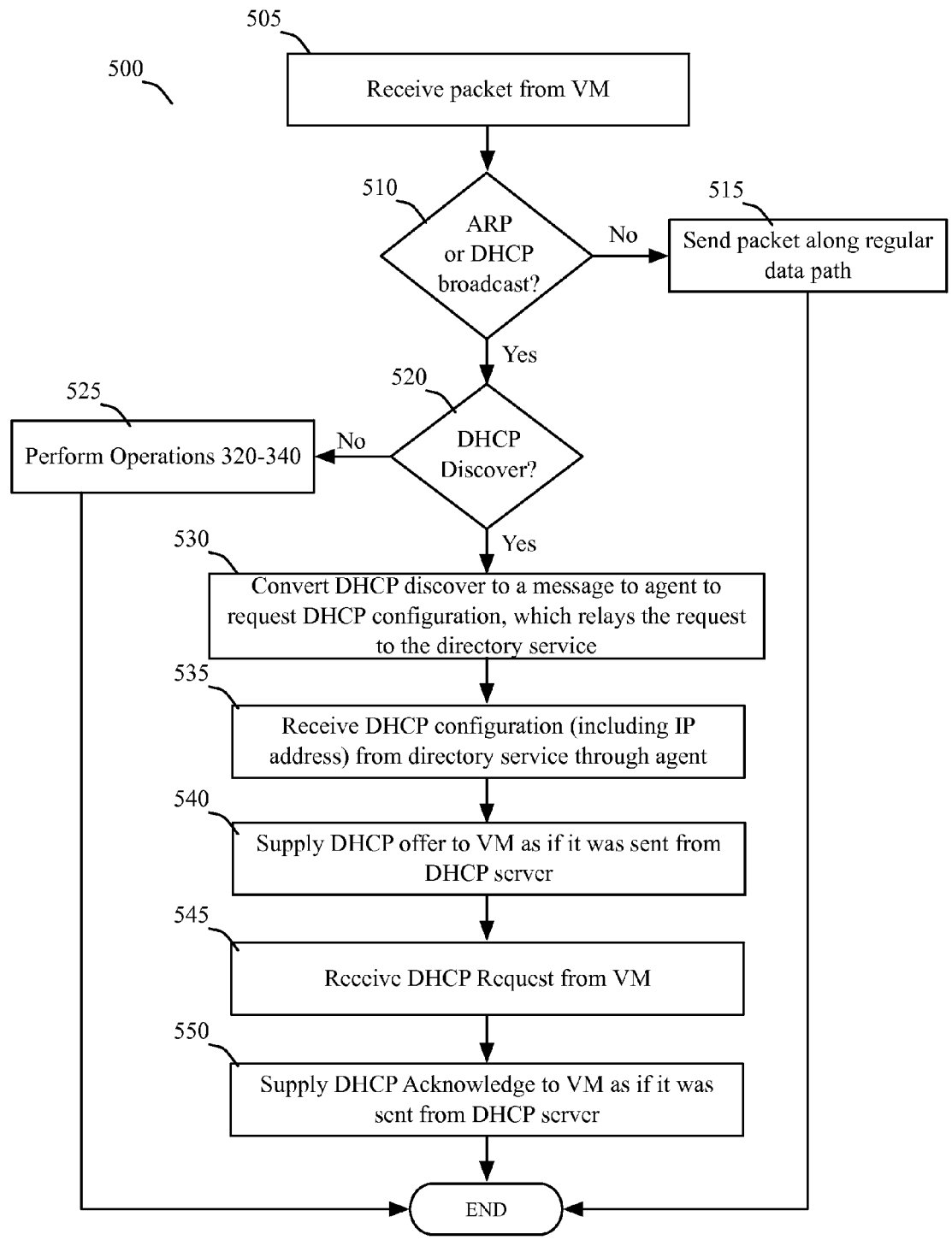
FIG. 5 conceptually illustrates a process that the proxy performs to handle a DHCP discover.
Figure 6:
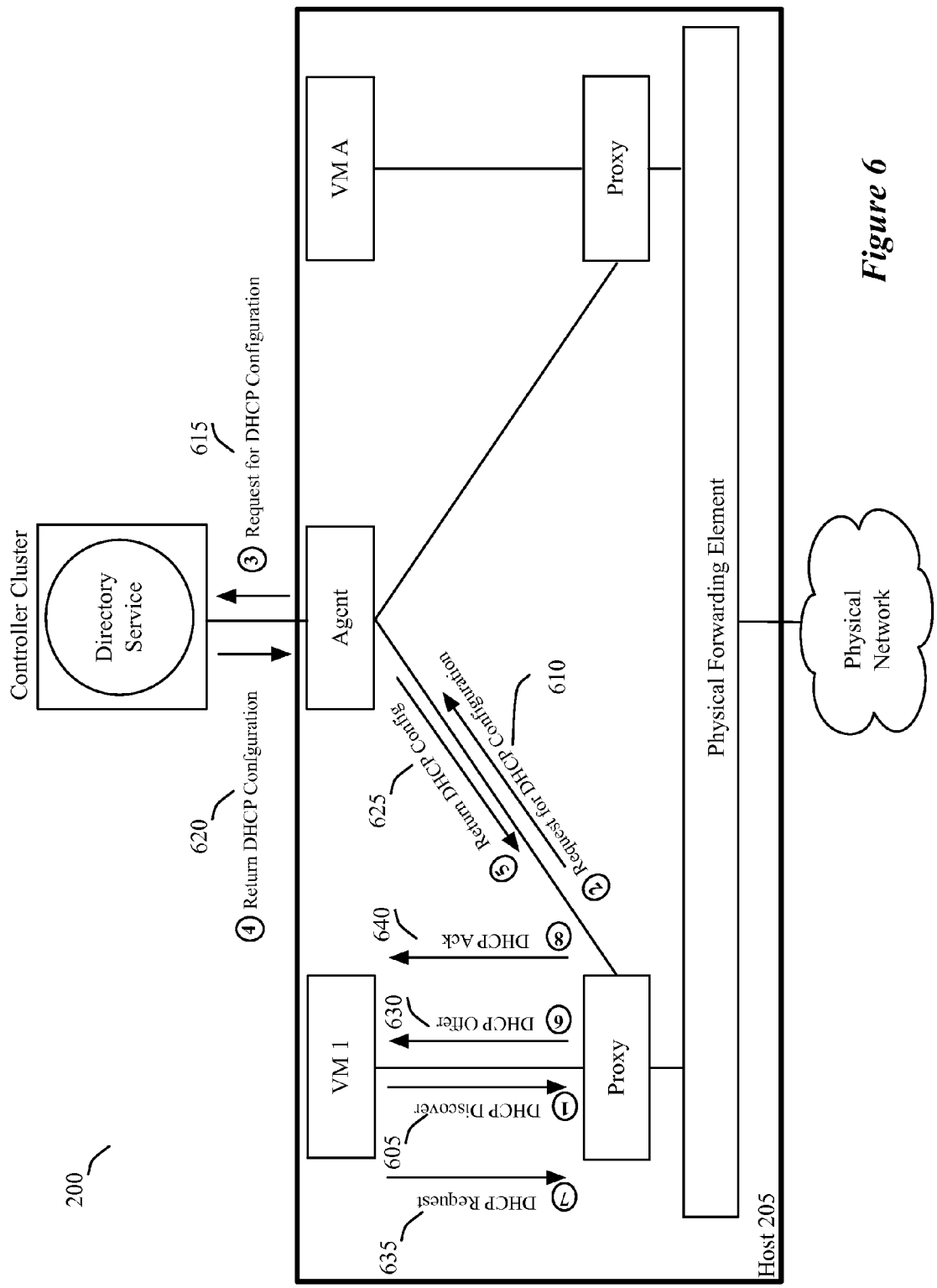
FIG. 6 illustrates the data flow through the architecture of FIG. 2A to handle the DHCP discover broadcast and associated DHCP request broadcast.

The operation of the proxies 215, agents 225 and directory service 250 during a DHCP discover broadcast will now be described by reference to FIGS. 5 and 6. FIG. 5 conceptually illustrates a process 500 that the proxy performs to handle a DHCP discover, while FIG. 6 illustrates the data flow through the architecture 200 to handle the DHCP discover broadcast and associated DHCP request broadcast. While the ARP process 300 ignored the reception of DHCP discover broadcasts, the process 500 accounts for both ARP and DHCP broadcast messages, as further described below. Alternatively, as further described in Section IV below, the DHCP proxy for a VM is a different proxy than the ARP proxy in some embodiments; in these embodiments, both of these proxies are part of the data path between the VM and its PFE and each proxy analyzes each packet sent from its VM to handle its respective broadcast packets.

As shown in FIG. 5, the process 300 starts (at 505) when the proxy 215 receives a packet from its VM. FIG. 6 shows an example of such a packet 605. In this example, the packet is a DHCP discover message from VM 1 of host 205. This message is a broadcast message to any DHCP server on the network (e.g., the logical network that contains the VM) for DHCP configuration information, including an IP address and any other information that is part of the DHCP set up. In some embodiments, the requested information (including the IP address) is information that will allow VM 1 of host 205 to operate with a set of other VMs in a logical network that is defined by the PFEs, which in some embodiments define other logical networks for other sets of VMs.

After receiving the packet (at 505), the process 500 determines (at 510) whether the packet is an ARP or DHCP broadcast message. If the packet is none of those broadcast messages, the process sends (at 515) the packet along the regular data path to the PFE 230 of the host or allows (at 515) another process that has called the process 500 to send this packet along the regular data path to the PFE. After 515, the process ends.

On the other hand, when the process determines (at 510) that the received packet is an ARP or DHCP broadcast, the process 500 determines (at 520) whether the packet is a DHCP packet. If not, the packet is an ARP packet, and the process transitions to 525 to perform the ARP related operations 320-340, which were described above by reference to FIG. 3, and then ends.

When the process determines (at 520) that the packet is a DHCP discover message, it generates (at 530) a message to its agent 225 to request the DHCP configuration for its VM. The agent, in turn, relays this request to the directory service, in order to obtain the DHCP configuration for the requesting proxy. In this manner, the process 500 converts the DHCP discover broadcast that is intended for all DHCP servers on the logical network to a unicast message to the directory service through its agent.

FIG. 6 shows an example of this conversion. Specifically, it illustrates that in response to the DHCP discover broadcast from VM 1 of host 205, the proxy sends a request 610 to its agent for the DHCP configuration requested by VM 1. In some embodiments, this request message has a different format than the DHCP discover packet received from VM 1. For instance, instead of being a DHCP request that is addressed to any DHCP server, it is a specific request message to the agent along the dedicated control channel socket between the proxy and the agent, in some embodiments.

In response to the request from the proxy, the agent sends a request 615 for the DHCP configuration to the directory service 250, as shown in FIG. 6. This request is an RPC message in some embodiments, while it is a message along a dedicated, secure control channel established between each agent and the directory service in other embodiments. Again, instead of being a general broadcast message to all DHCP servers for the logical network, the message from the agent to the directory service is a unicast message that is addressed to one directory service.

In response to this request, the directory service returns the requested DHCP configuration information, including an IP address in a return message 620 to the agent 225. In some embodiments, this reply is a parameter return that replies to an RPC from the agent, while in other embodiments, it is a message that replies to the message sent from the agent along the dedicated, secure control channel. The agent then sends the proxy a reply 625 that contains the received DHCP configuration. In some embodiments, this reply is through the socket connection between the proxy and agent.

FIG. 5 illustrates this reply as operation 535. After receiving the DHCP configuration at 535, the process 500 formulates and supplies (at 540) a DHCP offer packet to the VM. The DHCP offer packet will be formatted in the same manner that a traditional DHCP server provides such packets. FIG. 6 illustrates the DHCP offer 630 that the proxy sends to the VM 1 of host 205 to provide the DHCP offer with the supplied DHCP configuration information, which includes an IP address.

Traditionally, a device that receives a DHCP offer, sends a DHCP request message to accept the offer. When multiple DHCP servers exist in the network, the DHCP request message serves to notify the servers about which server is selected and which server or servers are not selected. The DHCP request message is accordingly a broadcast message to let all DHCP servers know which server was selected.

Accordingly, after receiving the DHCP offer, VM 1 of host 205 sends a DHCP request broadcast 635. The proxy intercepts this packet at 545. In response, at 550, the proxy generates a DHCP acknowledge message and supplies this DHCP acknowledge message 640 to the VM (as shown in FIG. 6). The supplied DHCP acknowledge message is in the DHCP acknowledgment format that a DHCP server would use to send such an acknowledge message. After 550, the process ends.

In some embodiments, the DHCP acknowledgment message may include additional configuration information. In some of these embodiments, the proxy receives this additional information (at 535) from the directory service through the agent when it received the message 625. However, in these embodiments, the proxy waits until it sends the DHCP acknowledgement message to provide this additional information to the VM. In other embodiments, to obtain this additional configuration information, the proxy interacts with the directory service through the agent (i.e., sends a message to agent, has the agent send a message to the directory service and receive a reply from the directory service, and then receives the agent's reply) to formulate a DHCP acknowledgment in response to a DHCP request message from the VM. Also, in some embodiments, the DHCP protocol that the directory service uses requires the proxy to interact with the directory service through the agent to formulate a DHCP acknowledgment in response to a DHCP request message from the VM.

FIGS. 7 and 8 illustrate several processes performed by the directory service of some embodiments in order to address ARP broadcast messages. FIG. 7 illustrates a process 700 that the directory service performs to maintain its IP-MAC mapping data storage, while FIG. 8 illustrates a process 800 that the directory service performs to respond to a request for a MAC address to resolve an ARP request.

The directory service executes on one controller (i.e., one computer) in some embodiments, while it executes on multiple controllers (i.e., multiple computers) in a distributed fashion in other embodiments. The operations illustrated in FIGS. 7 and 8 are operations executing on at least one controller in some embodiments (e.g., on only one computer in some embodiments, or on multiple computers in other embodiments).

As shown in FIG. 7, the process 700 initially receives (at 705) an IP-MAC update from a remote agent executing on one of the hosts. This update is an update sent by one of the proxies executing on the host. As mentioned above, the IP-MAC mapping updates are obtained by the controller in various different ways in different embodiments. In some embodiments, such an update is sent by the ARP proxies, while in other embodiments it is obtained through other means.

After receiving an IP-MAC update, the directory service stores (at 710) the IP-MAC address in its IP-MAC mapping data storage (e.g., database). If the directory service previously stored an IP address for the MAC address specified in the IP-MAC update, it updates the previous record to reflect the new IP address. The process 700 then provides (at 715) a reply acknowledgment to the agent that sent this update in some embodiments. In other embodiments, the process 700 does not provide a reply acknowledgment at 715. After 715, the process ends.

As shown in FIG. 8, the directory service starts the process 800 each time that it receives (at 805) a request from an agent a MAC address associated with an IP address. Such a request is sent by the agent at the behest of a proxy that needs this information in order to resolve an ARP request.

After receiving the request at 805, the directory service searches (at 810) its IP-MAC mapping data storage to determine whether it can find the supplied IP address, and if so, to retrieve the associated MAC address for the IP address. After searching (at 810) its data storage, the directory service sends (at 815) its reply to the agent that sent it the request at 805. The reply includes the requested MAC address when the directory service's search found a record with an IP address that matched the received IP address. On the other hand, the reply specifies a failure to find the desired MAC address when the directory service's search did not turn up a record with a matching IP address. After 815, the process 800 ends.

FIG. 9 illustrates a process 900 that the directory service performs in some embodiments to handle requests for DHCP configurations that are needed to resolve DHCP discover broadcasts. As shown in this figure, this process starts each time that the directory service receives (at 905) a request for DHCP configuration for a VM from an agent executing on the VM's host. Next, at 910, the process selects an IP address from a pool of available IP addresses that it maintains. In some embodiments, the directory service maintains several IP address pools for several different logical networks. In these embodiments, the process selects an IP address for a VM from the pool that stores the IP addresses for the VM's logical network.

After 910, the process formulates and sends a reply (at 915) to the agent that sent the request at 905. The reply includes the IP address selected at 910, and other DHCP configuration data (such as subnet mask, IP address for default gateway, IP address for DNS server, etc.). After 915, the process ends.

II. Push Based Proxy Architecture

Several of the above-described embodiments have proxies/agents query the directory service to pull (1) MAC addresses to resolve ARP broadcasts and (2) DHCP configurations to resolve DHCP broadcasts. Instead of using such pull based approaches, some embodiments use a push based approach that has the directory service publish data to the hosts, and then has the proxies or agents search the local copy of the pushed data to resolve ARP or DHCP broadcasts.

Figure 10:
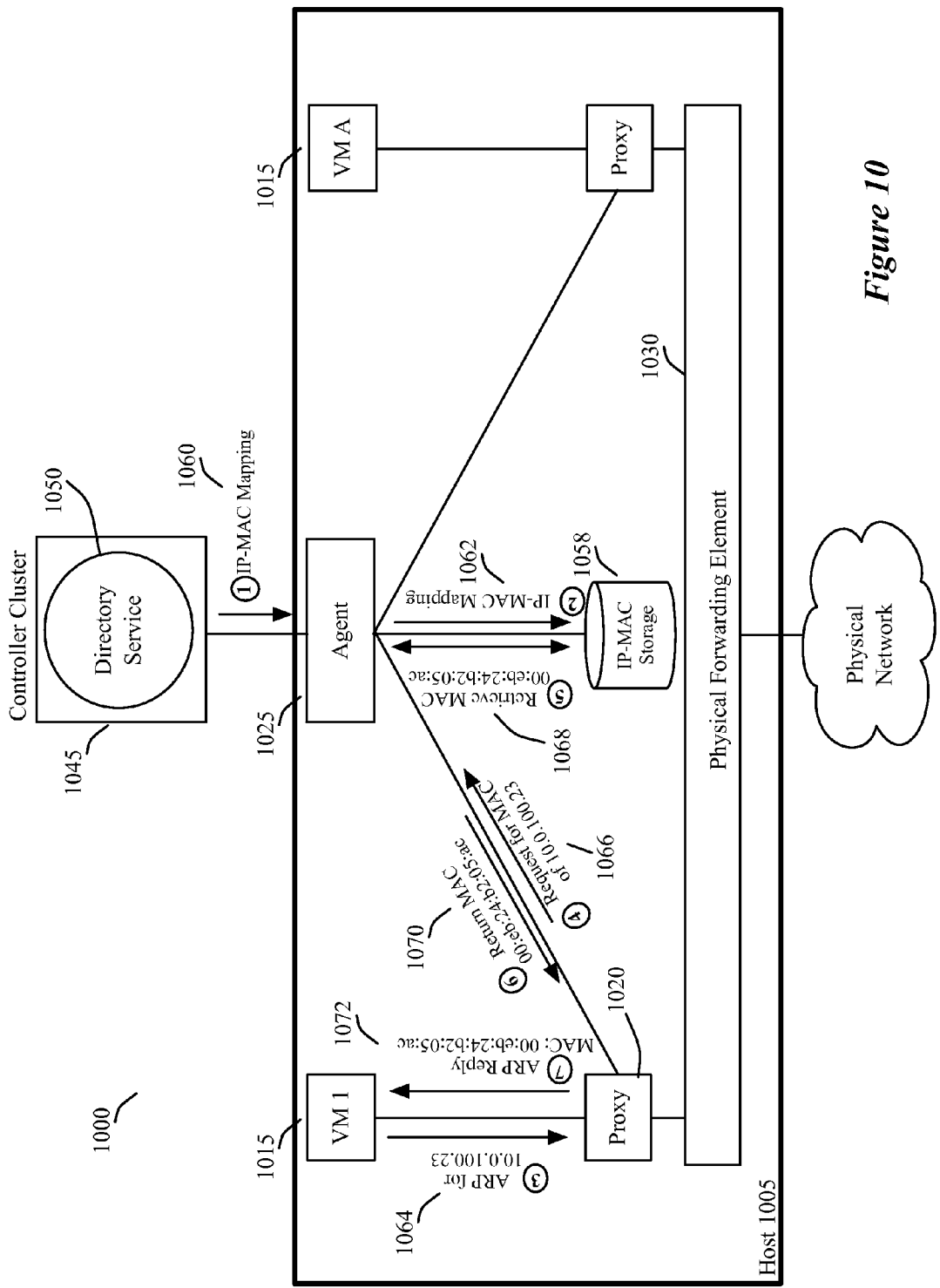
FIG. 10 illustrates the push-based architecture that some embodiments use to resolve ARP broadcasts.

FIG. 10 illustrates the push-based architecture 1000 that some embodiments use to resolve ARP broadcasts. This architecture 1000 is similar to the pull-based architecture 200 of FIG. 4, except that the agent 1025 queries a local copy of the IP-MAC data that it maintains based on data that the directory service periodically publishes to the host (e.g., to the agent 1025). FIG. 10 illustrates the directory service sending IP-MAC mapping data 1060 to the agent 1025. In some embodiments, the data is exchanged between the agent and the directory service (executing on one or more controllers) along a secure channel (e.g., encrypted, authenticated channel).

Also, in some embodiments, the directory service periodically publishes to the agents of the various hosts updates of the IP-MAC mapping that this service maintains. In some such embodiments, the directory service publishes to each host the portion of the mapping data that would be relevant to that host. The portion of the data that would be relevant to a host includes the IP-MAC mapping for the logical networks on which the VMs that execute on the host operate. In other words, the directory service of some embodiments does not publish IP-MAC mapping data to a host for a logical network that does not have any of its VMs executing on the host. Also, while the directory service of some embodiments periodically publishes its updates to a host on its schedule, the directory service of other embodiments pushes this data to a host only upon receiving request for such updates from the host.

FIG. 10 illustrates the agent 1025 storing the received IP-MAC mapping 1062 in an IP-MAC mapping storage 1058 that the agent maintains and searches. The IP-MAC mapping 1062 includes numerous IP-MAC data tuples, with each tuple specifying a MAC address for an IP address. In the architecture 1000, the agent 1025 maintains and accesses the IP-MAC storage instead of the proxies 1020 performing these operations, in order to provide a layer of security to segregate the data of one logical network from other logical networks. Specifically, the agent 1025 receives each proxy's request for the IP-MAC mapping data that is needed to resolve that proxy's ARP requests. If it detects one proxy of one VM of one logical network trying to request data for the VM of another logical network, the agent rejects such a request. As such a proxy does not have direct access to the IP-MAC mapping data, the agent's rejection of this request prevents the proxy from accessing data of any logical network for which the proxy is not authorized.

In the push-based architecture 1000, the process for resolving an ARP request starts and ends similar to the pull-based architecture 200 that was described above by reference to FIGS. 3 and 4. As mentioned above, the only difference is that the agent queries its local copy of the IP-MAC mapping that it maintains (e.g., in the local IP-MAC storage 1058) in the architecture 1000, instead of going to the directory service for this information.

As shown in FIG. 10, the ARP process starts when the proxy 1020 receives an ARP packet 1064 from its VM 1015, which is VM 1 of host 1005. As in the example of FIG. 4, in the example illustrated in FIG. 10, the ARP packet 1064 is an ARP for the IP address 10.0.10.24, which is an IP address of a VM (e.g., VM B) on the same or different host. This ARP packet is a broadcast packet that is intended for transmission to all devices on the same logical network as VM 1 of the host 1005, as described above. In some embodiments, the IP and MAC addresses are addresses defined in the address space that is set aside for the logical network to which VM 1 of host 1005 belongs.

After receiving the packet, the proxy determines whether the packet is an ARP broadcast. If not, the proxy sends the packet along the regular data path to the PFE 1030 of the host or allows another process that has called the proxy to send this packet along the regular data path to the PFE. On the other hand, when the received packet is an ARP broadcast, the proxy generates a message 1066 to its agent 1025 to request the MAC address for the IP address (i.e., 10.0.10.24) contained in the ARP broadcast. In this manner, the proxy 1020 converts the ARP broadcast that is intended for all devices on the logical network to a unicast message to the agent 1025. In some embodiments, the request that the proxy sends to the agent has a different format than the ARP packet received from VM 1. For instance, instead of being an ARP request with the default MAC address FF:FF:FF:FF:FF:FF, the request message is a MAC address call or message to the agent along the dedicated control channel socket between the proxy and the agent for the specific MAC address of the device with the associated IP address 10.0.10.24.

In response to the request from the proxy, the agent searches its local IP-MAC storage 1058 to find and retrieve the requested MAC address 1068, as shown in FIG. 10. To search the storage 1058, the agent uses the received IP address 10.0.10.24 to look up a MAC address in its IP-MAC storage 1058. Assuming that it finds the MAC address (e.g., 00:eb:24:c2:05:ac) of the specified IP address, the agent returns the identified MAC address in a return message 1070 to the proxy 1020. In some embodiments, this reply is through the socket connection between the proxy and agent. When the proxy 1020 receives the agent's reply 1070 with the requested MAC address, the proxy then formulates an ARP reply packet 1072 with the received MAC address, and then supplies the ARP reply to the VM that has sent the ARP broadcast. The ARP reply packet is formatted as if the device that had the specified IP address sent it in response to receiving the ARP request.

The agent might not store a MAC address for the IP address that is subject of a particular ARP message. Accordingly, in some situations, the agent of some embodiments will have to query the directory service to determine whether the service has the desired MAC address. If the directory service does not have the desired MAC address, the agent's reply to the proxy will notify the proxy that it could not find a MAC address for the specified IP address. In response, the proxy of some embodiments initiates an error handling process, like the one described above by reference to operation 330 of FIG. 3. Also, when the agent does not identify the MAC address by looking in its local storage 1058, the agent of some embodiments does not try to determine whether the directory service can find this MAC address. Instead, it simply notifies the proxy of its failure so that the proxy can initiate its error handling process.

Figure 11:
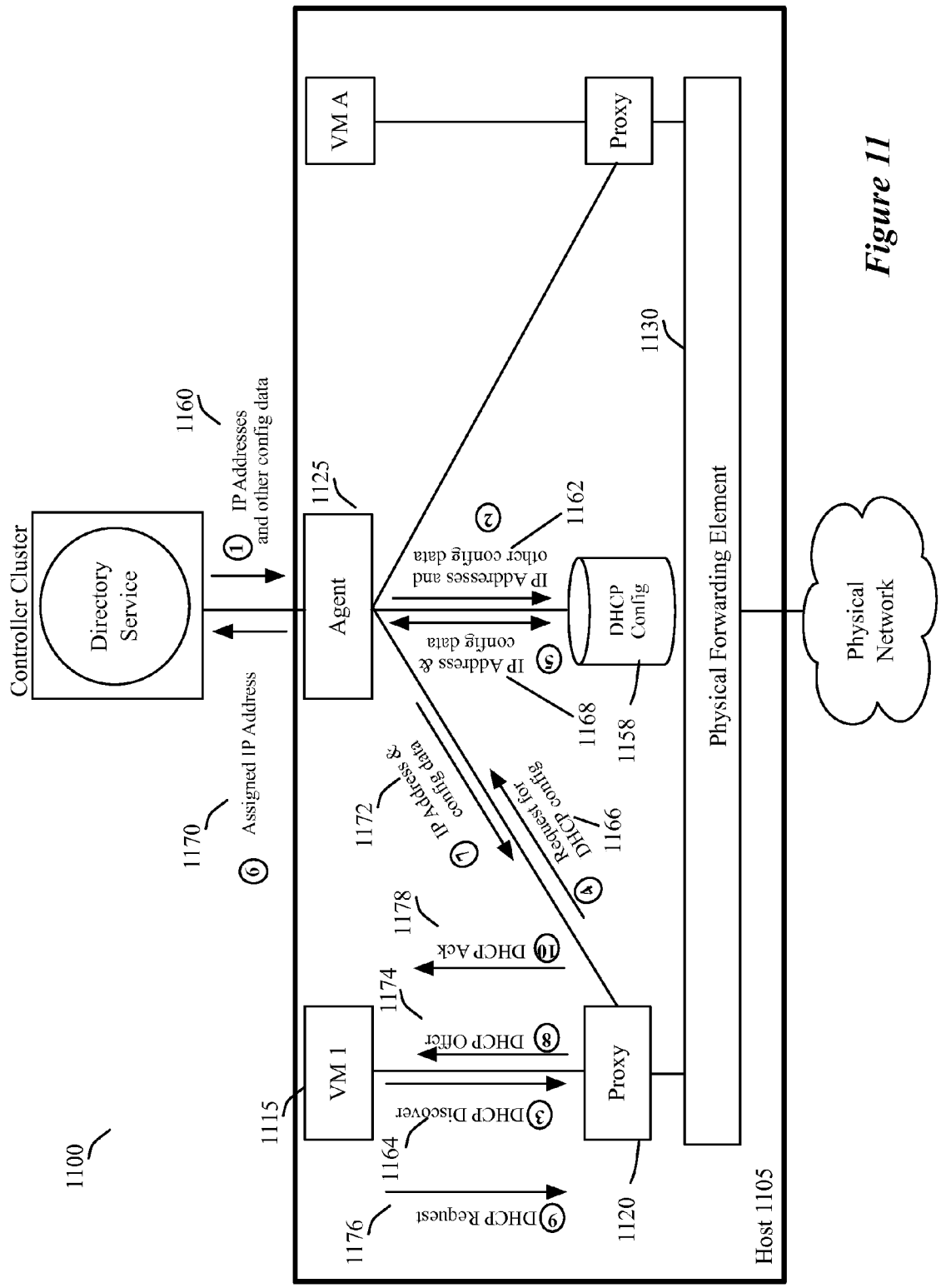
FIG. 11 illustrates the push-based architecture that some embodiments use to resolve DHCP broadcasts.

FIG. 11 illustrates the push-based architecture 1100 that some embodiments use to resolve DHCP broadcasts. This architecture 1100 is similar to the pull-based architecture 200 of FIG. 6, except that the agent 1125 queries a local copy of the DHCP configuration data that it maintains based on data that the directory service periodically publishes to the host (e.g., to the agent 1125). FIG. 11 illustrates the directory sending DHCP configuration data 1160 to the agent 1125. In some embodiments, the data is exchanged between the agent and the directory service (executing on one or more controllers) along a secure channel (e.g., encrypted, authenticated channel).

Also, in some embodiments, the directory service periodically publishes to the agents of the various hosts the same or different sets of DHCP configuration data that this service maintains. In some such embodiments, the directory service publishes to each host the portion of the DHCP configuration data that would be relevant to that host. The portion of the data that would be relevant to a host includes the DHCP configuration data for the LFEs on which the VMs that execute on the host operate. In other words, the directory service of some embodiments does not publish DHCP configuration data to a host for a LFE that does not have any of its VMs executing on the host. In some embodiments, the directory service guarantees that the IP allocations by different proxies do not conflict. For example, the directory service achieve in some embodiments by slicing the IP space into a number of small pieces and assigning the pieces to different proxies.

Also, while the directory service of some embodiments periodically publishes its updates to a host on its schedule, the directory service of other embodiments pushes this data to a host only upon receiving request for such updates from the host, or upon detecting a change in the LFEs or the hosts that implement the LFEs.

FIG. 11 illustrates the agent 1125 storing the received DHCP configuration data 1162 in DHCP configuration storage 1158 that the agent maintains and searches. In the architecture 1100, the agent 1125 maintains and accesses the DHCP storage instead of the proxies 1120 performing these operations, in order to provide a layer of security to segregate the data of one logical network from other logical networks. As mentioned above, this approach prevents a proxy of a VM within one logical network to access to the data of another logical network.

In the push-based architecture 1100, the proxy for resolving DHCP discover broadcast starts and ends like the pull-based architecture 200 that was described above by reference to FIGS. 5 and 6. As mentioned above, the only difference is that the agent queries its local copy of the DHCP configuration that it maintains (e.g., in the local DHCP configuration storage 1158) in the architecture 1100, instead of going to the directory service for this information.

As shown in FIG. 11, the DHCP broadcast process starts when the proxy 1120 receives a DHCP discover message 1164 from its VM 1115, which is VM 1 of host 1105. As in the example of FIG. 6, in the example illustrated in FIG. 11, this message is a broadcast message to any DHCP server on the network (e.g., the logical network that contains the VM) for DHCP configuration information, including an IP address and any other information that is part of the DHCP set up. In some embodiments, the requested information (including the IP address) is information that will allow VM 1 of host 1105 to operate with a set of other VMs in a logical network that is defined by the PFEs, which in some embodiments define other logical networks for other sets of VMs. In some embodiments, the DHCP configuration data is defined in the address space that is set aside for the logical network to which VM 1 of host 1105 belongs.

After receiving the message, the proxy 1120 determines whether the message is a DHCP discover broadcast message. If not, the proxy sends the packet along the regular data path to the PFE 1130 of the host or allows another process that has called the proxy to send this packet along the regular data path to the PFE. On the other hand, when the proxy determines that the received packet is DHCP discover broadcast, the proxy generates a message 1166 to its agent 1125 to request the DHCP configuration for its VM. In this manner, the proxy 1120 converts the DHCP discover broadcast that is intended for all DHCP servers on the logical network to a unicast message to the agent 1125. In some embodiments, this request message has a different format than the DHCP discover packet received from VM 1. For instance, instead of being a DHCP request that is addressed to any DHCP server, it is a specific request message to the agent that is sent along the dedicated control channel socket between the proxy and the agent, in some embodiments.

In response to the request from the proxy, the agent retrieves a set of DHCP configuration data 1168 from its local DHCP configuration storage 1158, as shown in FIG.

11. The retrieved set of configuration data includes an IP address for the VM 1115 in some embodiments. After retrieving this data, the agent sends a message 1170 to the directory service to notify this service that it will be providing the retrieved DHCP configuration to the VM 1115. In some embodiments, the agent awaits for a confirmation from the directory service that it can provide this data to the VM 1115, while in other embodiments the agent only uses the message 1170 to put the directory service on notice of the IP address assignment. In still other embodiments, the agent does not even send the notification message 1170 to the directory service.

In the embodiments where the agent waits for the directory service to confirm its acceptance of the retrieved DHCP configuration data (including IP address assignment) for the VM, the agent has to retrieve another set of DHCP configuration data when the directory service does not accept one set of retrieved DHCP configuration data. Also, when it cannot provide the requested DHCP configuration data for any reason, the agent of some embodiments interacts with the directory service to obtain such data.

After retrieving a set of DHCP configuration data that it can assign the VM 1115, the agent 1125 sends a return message 1172 to the proxy 1120. In some embodiments, this reply is through the socket connection between the proxy and agent. When the proxy 1120 receives the agent's reply 1172 with the requested IP address, the proxy then formulates a DHCP offer packet 1174 with the received IP address and other DHCP configuration data, and then supplies the DHCP offer 1174 to the VM 1115. The DHCP offer is formatted as if it was sent from a DHCP server (i.e., in a format that a traditional DHCP server provides such packets).

After receiving the DHCP offer, VM 1115 sends a DHCP request broadcast 1176. The proxy intercepts this packet and in response, the proxy generates a DHCP acknowledge message 1178 and supplies this DHCP acknowledge message to the VM 1115. The supplied DHCP acknowledge message is in a DHCP acknowledgment format that a DHCP server would use to send such an acknowledge message.

In some embodiments, the DHCP acknowledgment message may include additional configuration information. In some of these embodiments, the proxy receives this additional information in the agent's message 1172, but waits until it sends the DHCP acknowledgement message to provide this additional information to the VM. However, in other embodiments, because of the need to obtain this additional configuration information, the proxy interacts with the agent (i.e., has the agent retrieve this additional information from storage 1158) to formulate a DHCP acknowledgment in response to a DHCP request message from the VM.

In different embodiments, the directory service (i.e., the controller cluster) uses different approaches to push the ARP or DHCP data to the host computers. For instance, in some embodiments, the directory service pushes IP-MAC mapping or DHCP data (e.g., DHCP configuration or DHCP server data, as described below) to a new host when the host connects to one of the controllers in the controller cluster. Each time a host reports a new mapping to the controller cluster, the controller cluster pushes the new mapping to the other hosts. Also, each time a host disconnects from the controller cluster, the controller cluster pushes updated data tuples to remove the data associated with the disconnected host.

III. Alternative Methods for Suppressing DHCP Broadcast

Figure 12:
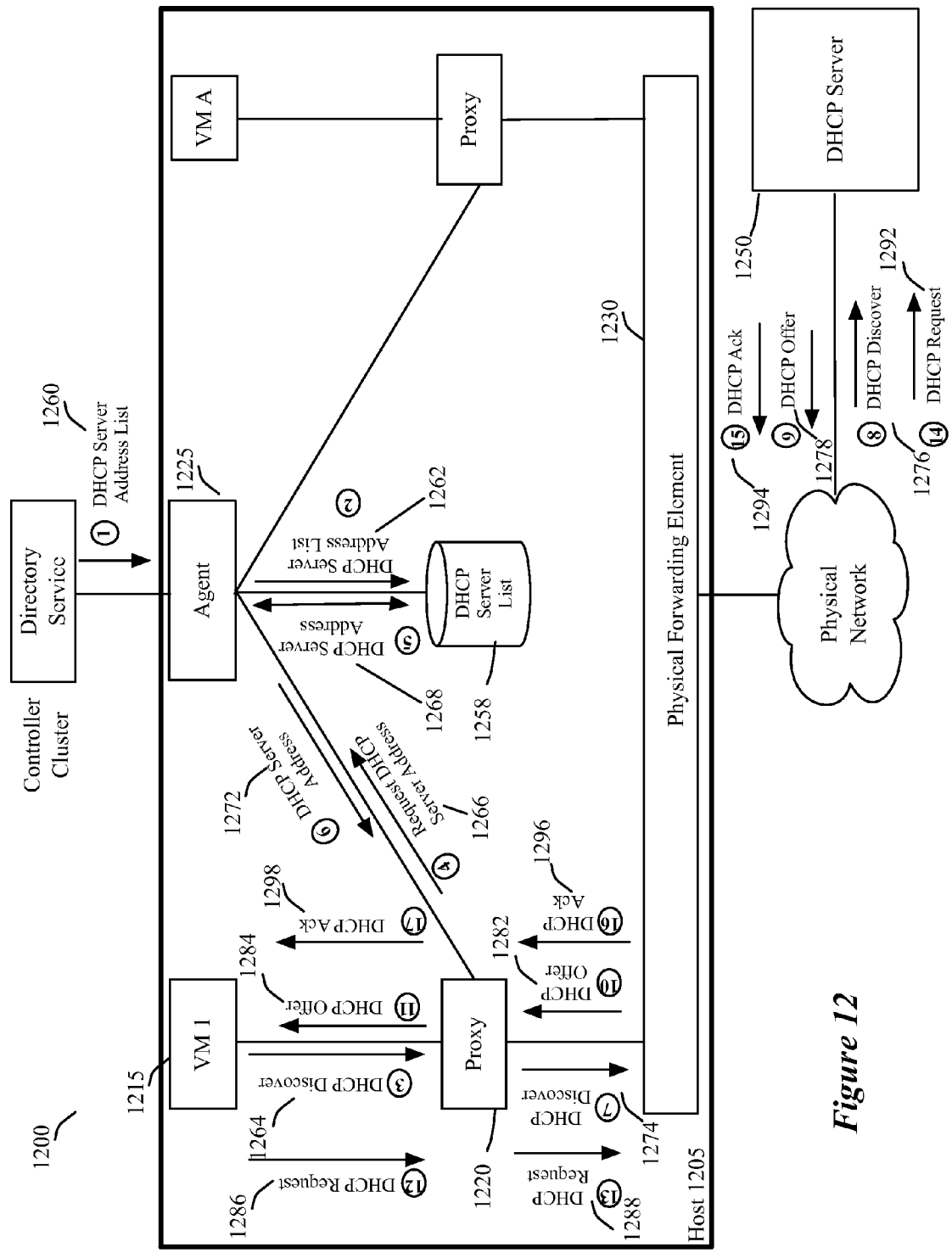
FIG. 12 illustrates an alternative method for preventing DHCP broadcast messages from being broadcast through the physical network.
Figure 13:
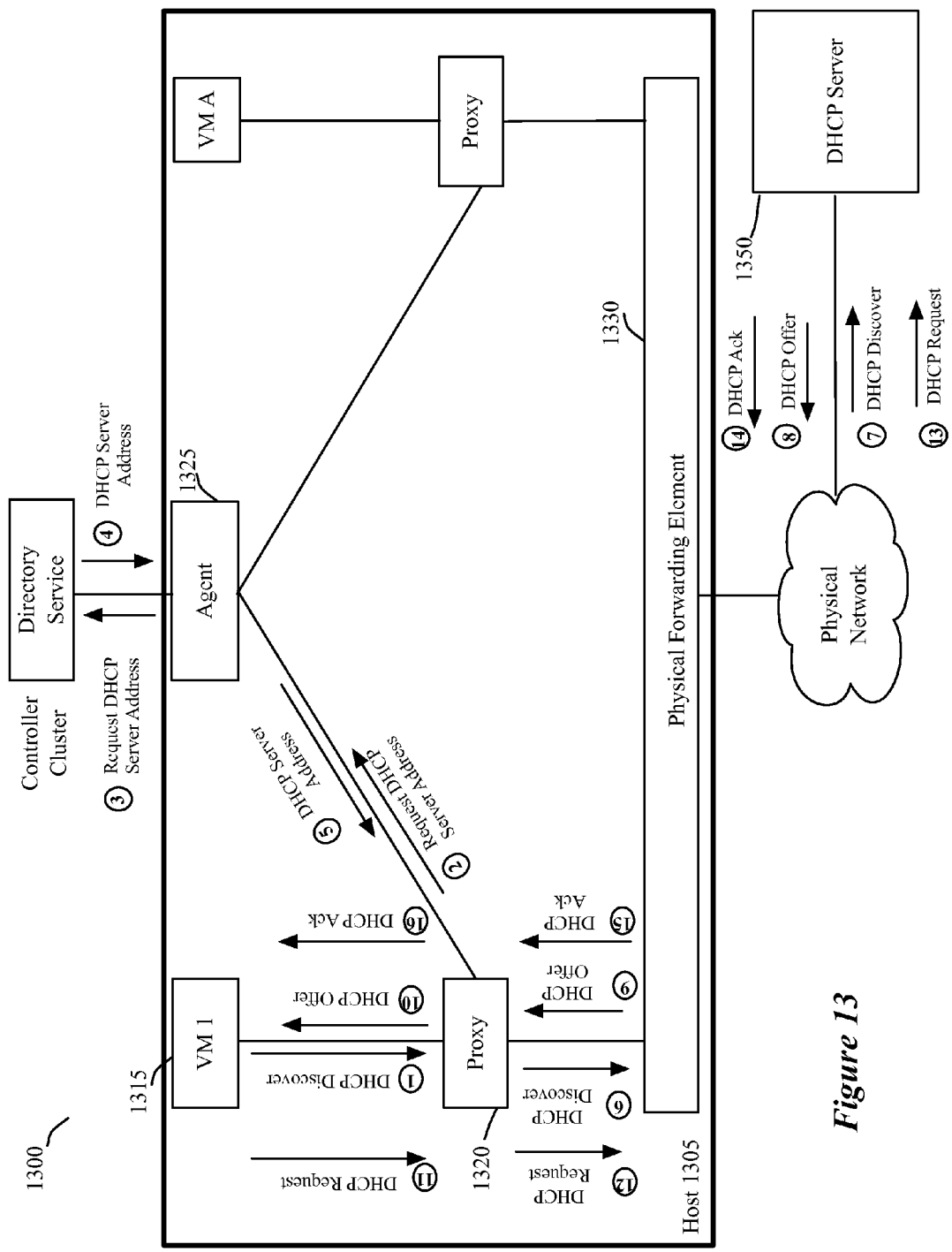
FIG. 13 illustrates yet another method of preventing DHCP broadcast messages from being broadcast through the physical network.

FIGS. 12 and 13 illustrate two additional methods that some embodiments use to suppress the sending of DHCP broadcast messages through the network. In both of these methods, the directory service of the controller cluster provides the network address (e.g., the IP address) of the DHCP server for the intercepting proxy to contact to obtain the desired DHCP configuration. In the method of FIG. 12, the directory service pushes the DHCP server address(es) to the host device, while in the method of FIG. 13, the directory service provides such addresses in response to specific requests from the host devices (i.e., the proxy of the host device pulls the addresses from the directory service).

The push-based architecture 1200 of FIG. 12 is similar to the push-based architecture 1100 of FIG. 11, except that unlike the architecture 1100 which pushes the DHCP configuration data to the host devices, the directory service in the architecture 1200 only pushes the DHCP server addresses to the host devices. In some embodiments, the directory service distributes the DHCP server functionality so that different DHCP servers are responsible for responding to the proxies of different host devices. In other embodiments, the directory service distributes the DHCP server functionality for the different LFEs among the available DHCP servers, so that a host's proxies may contact different DHCP servers to obtain DHCP configuration data for different LFEs. In some of these embodiments, one DHCP server can be responsible for multiple LFEs implemented by a host device.

In some of the embodiments that distribute DHCP server functionality for different LFEs among different DHCP servers, a directory service pushes a DHCP server list that is indexed by index values that are derivable from the LFE identifiers. In these embodiments, the host agent identifies a DHCP server for a particular VM's proxy by first generating an index value based on the identifier of the LFE with which the particular VM is associated. The host agent then retrieves the DHCP server address from the stored DHCP server list by identifying the data tuple on this list that has an index value that matches the generated index value.

As shown in FIG. 12, the host agent 1225 occasionally receives a DHCP server list 1260 from the directory service along the control channel connection between the agent and the controller that is responsible for pushing DHCP server list to the agent's host. The directory service periodically publishes the DHCP server list to the agent in some embodiments, while in other embodiments this service publishes the DHCP server list to the agent whenever the directory service detects the addition or removal of an LFE, VM, or host. To each host's agent, the published DHCP server list in some embodiments includes only the set of DHCP servers that are relevant for the host or for the LFEs implemented by the host. As shown in FIG. 12, the host agent 1225 stores the received DHCP server list 1262 in a storage 1258.

FIG. 12 illustrates that the DHCP broadcast process starts when the proxy 1220 receives a DHCP discover message 1264 from its VM 1215. As in the example of FIG. 11, in the example illustrated in FIG. 12, this message is a broadcast message to any DHCP server on the network (e.g., the logical network that contains the VM) for DHCP configuration information, including an IP address and any other information that is part of the DHCP set up, as described above.

After receiving the message, the proxy 1220 determines whether the packet is a DHCP discover broadcast message. When the packet is not a DHCP discover message, the proxy sends the packet along the regular data path to the PFE 1230 of the host or allows another process that has called the proxy to send this packet along the regular data path to the PFE. On the other hand, when the proxy determines that the received packet is a DHCP discover broadcast, the proxy generates a message 1266 to its agent 1225 to request the DHCP configuration for its VM. In this manner, the proxy 1220 converts the DHCP discover broadcast that is intended for all DHCP servers to a unicast message 1266 to the agent 1225. In some embodiments, this request message has a different format than the DHCP discover packet received from VM 1. For instance, instead of being a DHCP request that is addressed to any DHCP server, it is a specific request message to the agent that is sent along the dedicated control channel socket between the proxy and the agent, in some embodiments.

In response to the request from the proxy, the agent retrieves the DHCP server address 1268 from the DCHP server list stored in storage 1258. The DHCP server is the DHCP server for the host in some embodiments. In other embodiments, the agent uses the identifier of the LFE associated with the requesting proxy's VM to generate an index value, and then uses this index value to retrieve the identity of the DHCP server for this LFE. As shown in FIG. 12, the agent then provides the DHCP server address 1272 to the proxy 1220.

In some embodiments, the network address of the DHCP server is this server's IP address. Accordingly, when the proxy 1220 receives the agent's reply with the requested DHCP server's IP address, the proxy formulates a DHCP discover packet 1274 to the DHCP server 1250 by using its IP address, which was contained in the agent's reply. This DHCP discover packet is routed to the addressed DHCP server 1250 through the host's PFE 1230 and the intervening physical network.

The addressed DHCP server 1250 receives the DHCP discover packet 1276 from the intervening physical network. The DHCP server then replies with a DHCP offer 1278, which the proxy 1220 receives through the intervening physical network and the host's PFE. The DHCP offer 1282 that the proxy 1220 receives from the PFE 1230 contains some of the DHCP configuration data in some embodiments. The proxy, in turn, passes DHCP offer 1284 to the VM 1215. After receiving the DHCP offer, VM 1215 sends a DHCP request broadcast 1286. The proxy relays this packet as DHCP request packet 1288 again to the addressed DHCP server through the PFE and the intervening physical network. The DHCP server receives the DHCP request packet 1292 from the intervening physical network. The DHCP server 1250 then sends a DHCP acknowledge message 1294 to the proxy 1220 through the intervening physical network and the PFE 1230. In some embodiments, the DHCP acknowledgment message 1296 that the proxy receives from the PFE may include additional configuration information. The proxy, in turn, passes this DHCP acknowledge message 1298 to the VM 1215.

Figure 14:
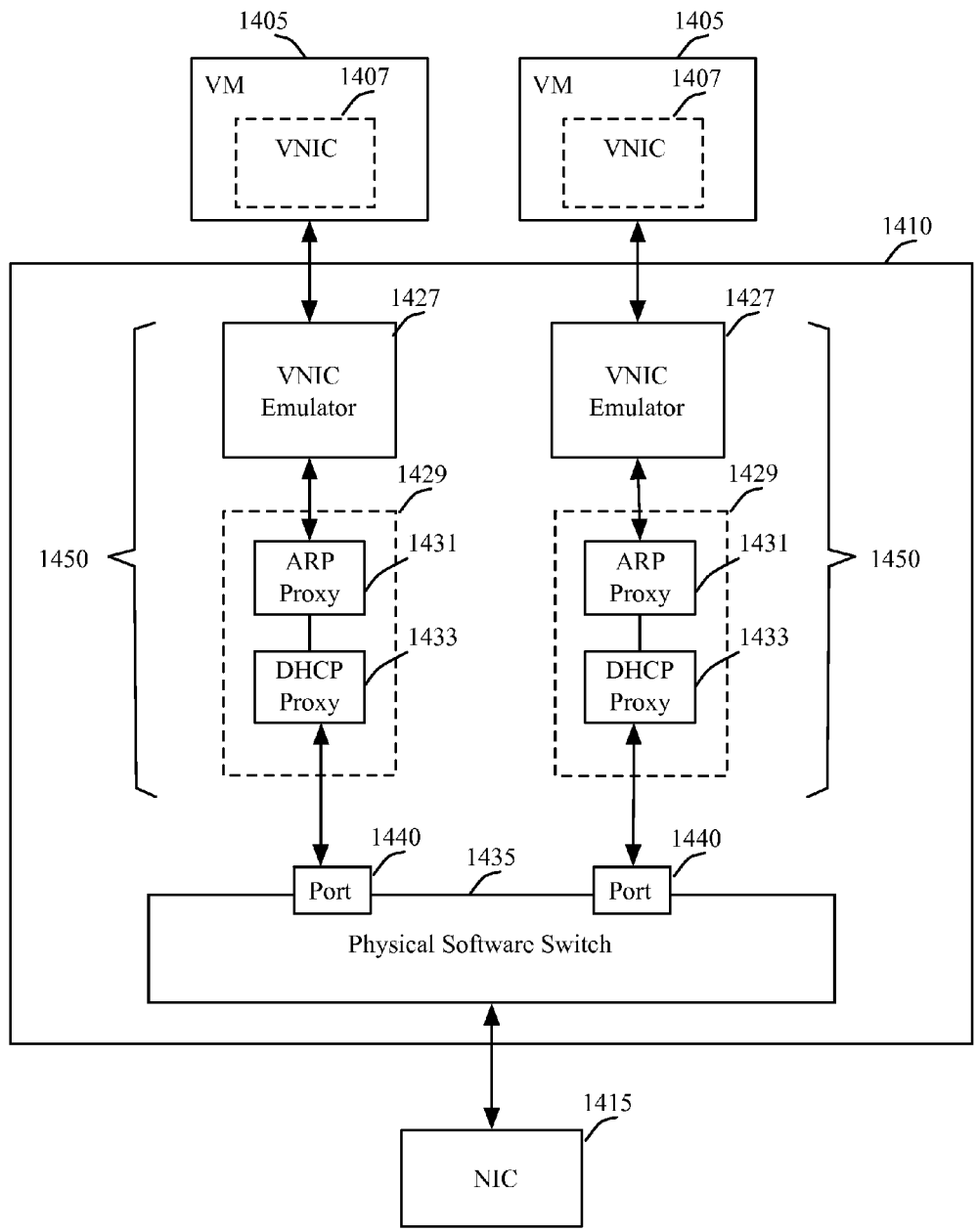
FIG. 14 illustrates the placement of the ARP and DHCP proxies in the data path in some embodiments of the invention.

While the above-described figures show the ARP and DHCP proxies as modules along the data path between the VM and the physical software switch, these proxies in some embodiments are function calls that are implemented as part of the VM's VNIC or the PFE's port, as further described below by reference to FIG. 14. Accordingly, in these embodiments, the DHCP proxy is a module that is called so that it can obtain the address of the DHCP server and can send that DHCP server a DHCP discover message as if the VM 1215 had sent this message. From there, the addressed DHCP server communicates directly with the VM 1215 through the PFE and the intervening physical network by exchanging the DHCP offer, DHCP request and DHCP acknowledge messages, without any further input or operation from the DHCP proxy 1220.

FIG. 13 illustrates a pull-based DHCP broadcast suppression method 1300 that is similar to that of FIG. 12 in that the directory service provides the address of the DHCP server to contact, and the DHCP proxy 1320 sends the DHCP discover message to just the DHCP server identified by the directory service. However, unlike the directory service of FIG. 12, which pushes the DHCP server addresses, the directory service of FIG. 13 provides the DHCP server address in response to a request from a host's agent.

FIG. 13 shows that the DHCP broadcast process starts when the proxy 1320 receives a DHCP discover broadcast packet from its VM. In response to this packet, the proxy sends a request to its agent for the DHCP server's address. This request is along the dedicated control channel socket between the proxy and the agent, in some embodiments.

In response to the request from the proxy, the agent sends a request for the DHCP server's address to the directory service along a dedicated, secure control channel connection established between each agent and the directory service. In response to this request, the directory service returns the requested DHCP server address, which in some embodiments is the IP address of the DHCP server. As mentioned above, the identified DHCP server in some embodiments is the DHCP server for the agent's host, while in other embodiments it is the DHCP server for the LFE associated with the VM 1315. To identify the DHCP server for the LFE, the directory service receives from the agent 1325 the identifier of the LFE associated with the VM 1315.

After the agent receives the address of the DHCP server 1350 to contact, it supplies this information to the proxy 1320. Once the proxy 1320 receives the DHCP server address, it operates identically to the proxy 1220 of FIG. 12. It exchanges the same messages with the addressed DHCP server 1350, and relays the same messages to and from the VM 1315, as the proxy 1220 does with the addressed DHCP server 1250 and VM 1215, in order to allow the VM 1315 to receive the requested DHCP configuration information.

As mentioned above, the illustration of the proxies as modules along the data path in FIG. 12 is conceptual for some embodiments. Similarly, the illustration of proxies as modules along the data path between the VMs and the PFE in FIG. 13 is conceptual for some embodiments. This is because these proxies in some embodiments are function calls that are implemented as part of the VM's VNIC or the PFE's port. Accordingly, in these embodiments, the DHCP proxy is a module that is called so that it can obtain the address of the DHCP server and can send that DHCP server a DHCP discover message as if the VM 1315 had sent this message. From there, the addressed DHCP server communicates directly with the VM 1315 through the PFE and the intervening physical network by exchanging the DHCP offer, DHCP request and DHCP acknowledge messages, without any further input or operation from the DHCP proxy 1320.

In the embodiments illustrated in FIGS. 12 and 13, the DHCP server engages in traditional DHCP message exchanges in order to provide the requested DHCP information. In other embodiments, however, the DHCP server provides to the requesting proxy the DHCP configuration data in reply to the initial request from the proxy. The proxy then engages in the traditional DHCP message exchange with the VM in order to provide the requested DHCP configuration data to the VM.

In FIGS. 10-12, the directory service is illustrated as the entity that provides the pushed ARP and DHCP data. As mentioned above, this service is provided in some embodiments by a controller cluster that includes one or more controllers. In some embodiments, the controller cluster has two or more controllers. In some of these embodiments, different controllers push different data tuples (e.g., different DHCP data tuples and/or different ARP data tuples) for different LFEs to the same host device. In other embodiments, each host device receives all of its pushed data tuples or all of its pushed data tuples of the same type from one controller; in some of these embodiments, one controller can push data tuples to more than one host, but each host gets its data tuples from only one controller.

IV. Data Path

The placement of the ARP and DHCP proxies in the data path will now be further described by reference to FIG. 14. As shown in this figure, each VM's ARP and DHCP proxies are placed in an I/O chain 1429 that is in the data path between the VM and a software switch. Specifically, FIG. 14 illustrates (1) two VMs 1405 that are executing on a host (not shown), (2) the host's physical NIC 1415 that is shared by the VMs, and (3) a network virtualization layer 1410 that facilitates traffic to and from the VMs through the shared physical NIC (PNIC).

The VMs execute on top of a hypervisor (not shown), which, in some embodiments, includes the network virtualization layer 1410. FIG. 14 shows each VM to include a virtual NIC (VNIC) 1407. It also shows the network virtualization layer 1410 to include one network stack 1450 for each VM, and a software switch 1435. Each network stack includes a VNIC emulator 1427 and an I/O chain 1429.

Each network stack connects to its VM through its VNIC emulator and connects to the software switch 1435, which is shared by all the network stacks of all the VMs executing on the host. Each network stack connects to the software switch through a virtual port 1440 of the switch. Specifically, in some embodiments, the software switch maintains a single virtual port 1440 for each VNIC. The software switch 1435 performs packet-processing operations to forward packets that it receives on one of its virtual ports to another one of its virtual ports. For example, in some embodiments, the software switch tries to use data in the packet (e.g., data in the packet header) to match a packet to flow based rules, and upon finding a match, performs the action specified by the matching rule. The software switch 1435 connects to the host's NIC 1415 (through a NIC driver (not shown)) to send outgoing packets and to receive incoming packets.

In some embodiments, the software switch is defined to include a virtual port (not shown) that connects to the NIC to send and receive packets to and from the NIC. Also, in some embodiments, the software switch of one host can form multiple logical switches with software switches of other hosts, with each logical switch serving a conceptual switch that services a logical network. In other words, different logical switches can be defined to specify different logical networks for different users, and each logical switch can be defined by multiple software switches on multiple hosts. VXLAN provides one manner for creating such logical switches. The VXLAN standard is described in Mahalingam, Mallik; Dutt, Dinesh G.; et al. (Aug. 5, 2013), VXLAN: A Framework for Overlaying Virtualized Layer 2 Networks over Layer 3 Networks, IETF.

Each VNIC in the VM is responsible for exchanging packets between the VM and the network virtualization layer through its associated VNIC emulator 1427. Each VNIC emulator interacts with the NIC drivers in the VMs to send and receive data to and from VMs. In some embodiments, the VNICs are software abstractions of physical NICs implemented by virtual NIC emulators. For instance, the code for requesting and obtaining a connection ID resides in components of virtual NIC emulators in some embodiments. In other words, the VNIC state is implemented and maintained by each VNIC emulator in some embodiments. Virtual devices such as VNICs are software abstractions that are convenient to discuss as though part of VMs, but are actually implemented by virtualization software using emulators in some embodiments. The state of each VM, however, includes the state of its virtual devices, which is controlled and maintained by the underlying virtualization software. Even though FIG. 14 shows one VNIC emulator for each VNIC of each VM, each VNIC emulator may maintain the state for more than one VNIC and/or for more than one VM in some embodiments.

The I/O chain in each network stack includes a series of modules that perform a series of tasks on each packet. Examples of some of these tasks include firewall and traffic tunneling operations. As shown in this figure, two other examples of I/O chain modules are an ARP proxy 1431 and DHCP proxy 1433 that resolve ARP and DHCP broadcast messages without resorting to broadcasting these messages. As mentioned above, when the ARP or DHCP proxy receives a packet that is not an ARP broadcast or DHCP broadcast, the proxy simply allows the packet to pass along the datapath (1) to the next module in the I/O chain, or (2) in case the ARP or DHCP module is the last module, to the software switch. On the other hand, when the received packet is an ARP broadcast or a DHCP broadcast, the ARP or DHCP proxy of some embodiments interact with the directory service and/or a local mapping storage through the host's agent (not shown) along a control channel to resolve the ARP or DHCP broadcast, in one of the above-described manners. The input or output of the I/O chain communicatively connects to one of the ports of the software switch.

In some embodiments, a thread that is associated with a network stack 1450 manages the modules of the I/O chain of the network stack. This thread is a kernel-level thread in some embodiments. As described in U.S. Provisional Patent Application 61/870,201, entitled "Traffic and Load Aware Dynamic Queue Management," filed on Aug. 26, 2013, some embodiments use a receive side thread to manage the network stack modules for received incoming packets, and use a transmit side thread to manage the network stack modules for transmitted outgoing packets.

While the above-described figures show the ARP and DHCP proxies as modules along the data path between the VM and the physical software switch, these proxies in some embodiments are function calls that are implemented as part of the VM's VNIC, VNIC emulator, or the port of the physical software switch 1435. Accordingly, in these embodiments, each proxy is a module that is called so that it can perform the operation that is needed to suppress an ARP or DCHP broadcast message. The data path between the VNIC emulator and its associated port can be viewed not to include any other intervening module, as the proxy operations are operations that can be initiated by function calls from the VNIC, VNIC emulator, or port constructs.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 15 conceptually illustrates an electronic system 1500 with which some embodiments of the invention are implemented. The electronic system 1500 can be used to execute any of the control, virtualization, or operating system applications described above. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1525, and the permanent storage device 1535.

From these various memory units, the processing unit(s) 1510 retrieve instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1525 is a read-and-write memory device. However, unlike storage device 1535, the system memory is a volatile read-and-write memory, such a random access memory. The system memory stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 3, 5, and 7-9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

In several figures described above, several embodiments are described for suppressing broadcast messages in computing and networking environments that include virtual machines and logical networks. However, one of ordinary skill will realize that the some embodiments are used in traditional physical networks with large numbers of computers or with numerous VMs executing on numerous hosts, in order to reduce broadcast message in these more traditional environments.

Also, several embodiments are described above by reference to IP-MAC mappings. However, the mappings in some embodiments alternatively or conjunctively include MAC-VTEP (virtual tunnel end point), or just VTEP data, where a VTEP is specified in terms of the IP that is used as the end point of a tunnel connecting two hosts. In view of the foregoing, one of ordinary skill in the art would understand that the invention is not to be limited by the foregoing illustrative details, but rather is to be defined by the appended claims.

We claim:

1. A method of suppressing broadcast packets in a network with a plurality of host devices executing a plurality of virtual machines (VMs), the method comprising:
   intercepting a broadcast packet sent by a particular VM along a datapath between the VM and a forwarding element to which the VM connects;
   converting the broadcast packet to a unicast, control channel message that comprises a subset of data from the broadcast packet, the unicast message requesting data needed to process the broadcast packet;
   without the broadcast packet reaching the forwarding element, sending the unicast message through a control channel to a set of controllers;
   through the control channel, receiving data needed to process the broadcast packet; and
   based on a reply received from the set of controllers, formulating a reply packet and supplying the formulated reply packet to the particular VM.

2. The method of claim 1, wherein the host devices each comprise at least one physical forwarding element (PFE) among a plurality of PFEs, wherein a logical forwarding element (LFE) among a plurality of LFEs is implemented by PFEs of two or more host devices, wherein the forwarding element to which the particular VM connects is a PFE of the host device that executes the particular VM.

3. The method of claim 2 further comprising directing an agent to send the unicast, control channel message to the set of controllers, the agent executing on the same host device as the particular VM.

4. The method of claim 3 further comprising:
   determining that the intercepted broadcast packet relates to a particular LFE among the plurality of LFEs;
   wherein directing the agent comprises directing the agent to send the unicast, control channel message to a controller in the set of controllers associated with the particular LFE.

5. The method of claim 1, wherein
   the broadcast packet is an address resolution protocol (ARP) broadcast packet;
   the unicast, control channel message comprises a request for a media access control (MAC) address associated with a particular IP address; and
   formulating and supplying the reply packet comprises formulating an ARP reply packet with the received MAC address and supplying the formulated ARP reply packet to the particular VM.

6. The method of claim 5, wherein the ARP reply packet is in a format that mirrors a reply packet from a destination device that has an IP address that matches an IP address in the ARP broadcast packet.

7. The method of claim 1, wherein the broadcast packet is a dynamic host configuration protocol (DHCP) discover broadcast packet, wherein the unicast, control channel message comprises a request for a network address of a DHCP server, wherein receiving data needed to process the broadcast packet comprises receiving the network address of the DHCP server from the set of controllers, wherein formulating and supplying the reply packet comprises:
   using the network address to send the DHCP server a unicast packet requesting DHCP configuration data;
   receiving the DHCP configuration data from the DHCP server; and
   providing a set of DHCP broadcast reply packets to the particular VM to provide the VM with the requested DHCP configuration data.

8. The method of claim 7, wherein the set of DHCP broadcast reply packets includes a DHCP offer packet and a DHCP acknowledge packet.

9. The method of claim 1, wherein the broadcast packet is a dynamic host configuration protocol (DHCP) discover broadcast packet, wherein the unicast, control channel message comprises a request for a network address to a DHCP server, wherein receiving data needed to process the broadcast packet comprises receiving the network address to the DHCP server from the set of controllers and formulating and supplying the reply packet comprises using the network address to send the DHCP server a DHCP discover packet, wherein in response to the DHCP discover packet, (i) the DHCP server replies to the particular VM with a DHCP offer packet that comprises DHCP configuration data, (ii) the particular VM sends a DHCP request packet to the DHCP server, and (iii) the DHCP server sends a DHCP acknowledge packet to the particular VM.

10. The method of claim 1, wherein the broadcast packet is a dynamic host configuration protocol (DHCP) discover broadcast packet, wherein the unicast, control channel message comprises a request for a network address of a DHCP server, wherein receiving data needed to process the broadcast packet comprises receiving the network address of the DHCP server from the set of controllers, wherein formulating and supplying the reply packet comprises:
   using the network address to send the DHCP server a DHCP discover packet;
   from the DHCP server, receiving a DHCP offer packet comprising DHCP configuration data; and
   supplying the DHCP offer packet to the particular VM, wherein the method further comprises:
   receiving a DHCP request packet from the particular VM;
   relaying the DHCP request packet to the DHCP server;

from the DHCP server, receiving a DHCP acknowledge packet; and supplying the DHCP acknowledge packet to the particular VM.

11. The method of claim 1, wherein the broadcast packet is a dynamic host configuration protocol (DHCP) discover broadcast packet, wherein the unicast, control channel message comprises a request for DHCP configuration data to the set of controllers, the received data needed to process the broadcast packet comprises DHCP configuration data received from the set of controllers, and formulating and supplying a reply packet comprises providing a set of DHCP broadcast reply packets to the particular VM to provide the particular VM with the requested DHCP configuration data.

12. The method of claim 11, wherein the set of DHCP broadcast reply packets comprises:
a DHCP offer packet with at least part of the DHCP configuration; and
a DHCP acknowledge packet that is supplied to the particular VM in response to a DHCP request broadcast packet received from the particular VM.

13. The method of claim 12, wherein the DHCP acknowledge packet includes additional DCHP configuration data.

14. The method of claim 1, wherein
the host devices each comprise at least one physical forwarding element (PFE) among a plurality of PFEs;
a logical forwarding element (LFE) among a plurality of LFEs is implemented by PFEs of at least two host devices;
the set of controllers provide a directory service that stores data for processing requests for data needed to resolve broadcast packets; and
the controllers are for configuring the PFEs to implement the LFEs.

15. A non-transitory machine readable medium for a particular host computer that executes a plurality of virtual machines and a physical forwarding element (PFE), the PFE for implementing a plurality of logical forwarding elements (LFEs), wherein at least one of the LFEs is also implemented by PFEs executing on other host computers in a network with the particular host computer, the medium storing a program for suppressing broadcast packets in the network, the program comprising sets of instructions for:
intercepting a broadcast packet sent by a particular VM associated with a particular LFE along a datapath between the VM and the PFE, to which the VM connects;
converting the broadcast packet to a unicast, control channel message that comprises a subset of data from the broadcast packet and without the broadcast packet reaching the PFE, sending the unicast message through an out-of-band control channel to a controller, said unicast message requesting data needed to process the broadcast packet, wherein the controller is one controller in a plurality of controllers that is responsible for managing the particular LFE;
through the out-of-band control channel, receiving, from the controller, data needed to process the broadcast packet; and
based on the data received from the controller, formulating a reply packet and supplying the formulated reply packet to the particular VM.

16. The machine readable medium of claim 15, wherein the program further comprises a set of instructions for directing an agent to send the unicast, control channel message to the controller, the agent executing on the same host device as the particular VM.

17. The machine readable medium of claim 15, wherein
the broadcast packet is an address resolution protocol (ARP) broadcast packet;
the unicast, control channel message comprises a request for a media access control (MAC) address associated with a particular IP address;
the set of instructions for formulating and supplying the reply packet comprises sets of instructions for formulating an ARP reply packet with the received MAC address and supplying the formulated ARP reply packet to the particular VM.

18. The machine readable medium of claim 17, wherein the ARP reply packet is in a format that mirrors a reply from a destination device that has an IP address that matches an IP address in the ARP broadcast packet.

19. The machine readable medium of claim 15, wherein the broadcast packet is a dynamic host configuration protocol (DHCP) discover broadcast packet, wherein the unicast, control channel message comprises a request for a network address to a DHCP server, wherein the set of instructions for receiving data needed to process the broadcast packet comprises a set of instructions for receiving the network address of the DHCP server from the controllers, wherein the set of instructions for formulating and supplying the reply packet comprises sets of instructions for:
using the network address to send the DHCP server a unicast packet requesting DHCP configuration data;
receiving the DHCP configuration data from the DHCP server; and
providing a set of DHCP broadcast reply packets to the particular VM to provide the VM with the requested DHCP configuration data.

20. The machine readable medium of claim 15, wherein the broadcast packet is a dynamic host configuration protocol (DHCP) discover broadcast packet, wherein the unicast, control channel message comprises a request for a network address to a DHCP server, wherein the set of instructions for receiving data needed to process the broadcast packet comprises a set of instructions for receiving the network address of the DHCP server from the controller, wherein the set of instructions for formulating and supplying the reply packet comprises a set of instructions for using the network address to send the DHCP server a DHCP discover packet,
wherein in response to the DHCP discover packet, (i) the DHCP server replies to the particular VM with a DHCP offer packet that comprises DHCP configuration data, (ii) the particular VM sends a DHCP request packet to the DHCP server, and (iii) the DHCP server sends a DHCP acknowledge packet to the particular VM.

21. The machine readable medium of claim 15, wherein the broadcast packet is a dynamic host configuration protocol (DHCP) discover broadcast packet, wherein the unicast, control channel message comprises a request for a network address to a DHCP server, wherein the set of instructions for receiving data needed to process the broadcast packet comprises a set of instructions for receiving the network address of the DHCP server from the controller wherein the set of instructions for formulating and supplying the reply packet comprises sets of instructions for:
using the network address to send the DHCP server a DHCP discover packet;
from the DHCP server, receiving a DHCP offer packet comprising DHCP configuration data;
supplying the DHCP offer packet to the particular VM, wherein the program further comprises sets of instructions for:
receiving a DHCP request packet from the particular VM;

relaying the DHCP request packet to the DHCP server;
from the DHCP server, receiving a DHCP acknowledge packet; and
supplying the DHCP acknowledge packet to the particular VM.

22. The machine readable medium of claim 15, wherein the broadcast packet is a dynamic host configuration protocol (DHCP) discover broadcast packet, wherein the unicast, control channel message comprises a request for DHCP configuration data to the controller, the received data needed to process the broadcast packet comprises DHCP configuration data received from the controller, and the set of instructions for formulating and supplying a reply packet comprises a set of instructions for providing a set of DHCP broadcast reply packets to the particular VM to provide the particular VM with the requested DHCP configuration data.

23. The machine readable medium of claim 22, wherein the set of instructions for providing the set of DHCP broadcast packet replies comprises sets of instructions for:
supplying a DHCP offer packet with at least part of the DHCP configuration;
from the particular VM, receiving a DHCP request broadcast packet; and
replying with a DHCP acknowledge packet to the source of the DHCP broadcast packet.

24. The machine readable medium of claim 15, wherein the out-of-band control channel operates between an agent operating on the particular host and the controller.

25. For a network with a plurality of host devices executing a plurality of virtual machines (VMs), each host comprising at least one physical forwarding element (PFE) that implements a plurality of logical forwarding elements (LFEs), wherein at least one of the LFEs is implemented by the PFEs of at least two of the hosts, a method for suppressing broadcast messages that are sent by a particular VM of a particular host, the method comprising:

intercepting a broadcast packet sent by a VM along a datapath between the particular VM and the PFE of the particular host;
without the broadcast packet reaching the PFE of the particular host, directing an agent executing on the particular host to send a unicast control channel message that comprises a subset of data from the broadcast packet through a dedicated out-of-band control channel to a controller for data needed to process the broadcast packet;
from the controller through the out-of-band control channel, receiving data needed to process the broadcast packet; and
based on the data received from the controller, formulating a reply packet and supplying the formulated reply packet to the particular VM.

26. The method of claim 25, wherein the particular VM is a first VM, the broadcast packet is a first broadcast packet, and the reply packet is a first reply packet, the method further comprising:
intercepting a second broadcast packet sent by a second VM on the particular host along a datapath between the second VM and the PFE of the particular host;
directing the agent executing on the particular host to send a unicast control channel message through the dedicated out-of-band control channel to the controller for data needed to process the second broadcast packet;
from the controller through the out-of-band control channel, receiving data needed to process the second broadcast packet; and
based on the data received from the controller, formulating a second reply packet and supplying the formulated second reply packet to the second VM.

* * * * *